United States Patent
Daly et al.

(10) Patent No.: US 9,206,320 B1
(45) Date of Patent: Dec. 8, 2015

(54) MATTE-APPEARANCE POWDER COATING COMPOSITIONS WITH CHEMICAL AGENT RESISTANCE

(71) Applicant: Henzten Coatings, Inc., Milwaukee, WI (US)

(72) Inventors: Andrew T. Daly, Cedarburg, WI (US); Timothy P. Willman, Mequon, WI (US); Kiran Bhat Kashi, Germantown, WI (US); Michael J. Hentzen, Whitefish Bay, WI (US); Albert L. Hentzen, Milwaukee, WI (US)

(73) Assignee: Hentzen Coatings, Inc., Milwaukee, WI (US)

( * ) Notice: Subject to any disclaimer, the term of this patent is extended or adjusted under 35 U.S.C. 154(b) by 14 days.

(21) Appl. No.: 13/945,740

(22) Filed: Jul. 18, 2013

(51) Int. Cl.
*C09D 5/03* (2006.01)

(52) U.S. Cl.
CPC ...................... *C09D 5/032* (2013.01)

(58) Field of Classification Search
CPC ........................................ C09D 5/032
USPC ............................................. 524/210
See application file for complete search history.

(56) References Cited

U.S. PATENT DOCUMENTS

| | | | |
|---|---|---|---|
| 4,345,057 A | 8/1982 | Yamabe et al. | |
| 4,916,188 A * | 4/1990 | Reising | 525/124 |
| 5,593,730 A | 1/1997 | Satgurunathan et al. | |
| 5,621,064 A | 4/1997 | Laas et al. | |
| 5,691,410 A | 11/1997 | Escarsega et al. | |
| 6,432,488 B1 | 8/2002 | Daly et al. | |
| 6,759,096 B2 * | 7/2004 | MacQueen et al. | 427/494 |
| 7,332,545 B2 | 2/2008 | Coca et al. | |
| 2004/0180230 A1 * | 9/2004 | Muthiah | 428/480 |
| 2004/0191555 A1 * | 9/2004 | Germano | 428/553 |
| 2011/0039030 A1 | 2/2011 | Spyrou | |
| 2011/0136972 A1 * | 6/2011 | Flosbach et al. | 524/590 |

FOREIGN PATENT DOCUMENTS

JP   2012-041383   * 3/2012   ........... C09D 127/12

OTHER PUBLICATIONS

Machine translation of JP 2012-041383. Mar. 2012.*
ACG Chemicals Americas, Inc., "Lumiflon Fluoropolymer Resins Long Term Performance vs. PVDF," Date: 2010.
Winn Darden, et al., "Advances in Fluoropolymer Resins for Long Life Coatings," ACG Chemicals Americas, Exton, PA, Date: 2010.
Bayer Material Science LLC, "CRELAN EF403," <http://www.bayermaterialsciencenafta.com/products/index.cfm?mode=lit &ppnum=EB7C5 . . . , Pittsburgh, PA, Date: May 8, 2013.
Bayer Material Science LLC, "CRELAN EF403 Cycloaliphatic Polyuretdione," Pittsburgh, PA, Date: Jun. 2012.
Naoko Sumi, et al., "Fluoropolymer Dispersions for Coatings," The Waterborne Symposium, New Orleans, LA, Date: Feb. 2008.
Lubrizol Advanced Materials, Inc., "Powder Add 9083 Micronized PTFE-Modified Polyethylene Wax," Date: Jun. 2007.
ACG Chemicals Americas, Inc., "LUMIFLON LF-710F Resin Product Data Sheet," Date: Undated.
ACG Chemicals Americas, Inc., "LUMIFLON LF710F Material Safety Data Sheet," Date: Sep. 11, 2009.
ACG Chemicals Americas, Inc., "LUMIFLON FEVE Resin," Date: Copyright 2012.
ITW Gema, "Electrostatic Powder Coating," Date: Jul. 2002.
Momentive Specialty Chemicals S.r.l., "Product Bulletin Powder Coating Resins and Additives," Date: Mar. 2011.
SERDP, "Novel Coatings Systems for Use as High Performance Chemical Agent Resistant Powder Topcoats," Date: Jan. 2013.
Innovadex LLC, "Crekat XP 2571," <www.innovadex.com/coatings/detail/94/89633/CREKAT-XP-2571>, Date: Copyright 2012.
Special Chem S.A., "Albester 3110," <www.specialchem4coatings.com/tds/albester-3110/momentive/14043/index.aspx>, Date: Copyright 2013.

* cited by examiner

*Primary Examiner* — John Uselding
(74) *Attorney, Agent, or Firm* — Jansson Munger McKinley & Shape Ltd.

(57) ABSTRACT

Matte-appearance chemical-agent-resistant powder coating compositions are described. In embodiments, powder coating compositions comprise a resin component, a polyisocyanate-containing uretdione cross-linking agent, catalyst, and flattening agent. The resin component may comprise a hydroxyl-containing resin and a hydroxyl-containing halogenated copolymer resin. Catalyzed cross-linking of the uretdione isocyanate groups and resins of the resin component during curing preferably yields a finished-form film with low levels of gloss and sheen and chemical-agent resistance.

32 Claims, No Drawings

MATTE-APPEARANCE POWDER COATING COMPOSITIONS WITH CHEMICAL AGENT RESISTANCE

FIELD

The field is related generally to coating compositions and, more particularly, to powder coating compositions.

BACKGROUND

Powder coating compositions are dry, free flowing powders applied in fusion coating processes. A fusion coating process is a process in which a powder coating is distributed over a substrate and, when heated, fuses to form a continuous film. The substrate may be heated or unheated when the powder is applied thereto. Heat supplied from the substrate or from an external source, such as an oven, causes the powder to fuse into the continuous film. Known fusion coating processes for application of powder coating compositions to a substrate include electrostatic spraying, fluidized bed coating, and hot flocking.

One potential application for powder coating compositions is for use as primers and topcoats for military applications. Military equipment, such as wheeled and tracked vehicles, weapons, machinery, and other objects are ideally suited for painting with powder coating compositions. Civilian versions of military equipment and non-military objects can also benefit from the surface protection provided by powder coating compositions.

An advantage of powder coating compositions for both military and civilian applications is that such coating compositions can be formulated to provide a durable, protective finish on the coated article. Such finish can be provided at a relatively low cost because all of the coating can be used; any excess coating material can be reclaimed. Reclamation of any excess coating also avoids costs associated with disposal of waste material.

Another reason that powder coating compositions are attractive for use in military and civilian applications alike is that powder coating compositions have low or no volatile organic compound (VOC) content. There is regulatory pressure to reduce VOC content in coatings because VOCs are known to be air pollutants. A disadvantage of liquid-based coating compositions presently utilized as topcoats in military and civilian applications is that such coating compositions all require VOC-containing solvent systems. Even water-reducible plural-component coating compositions can include from 1.8 to 3.5 pounds VOC content per gallon of coating composition. Powder coating compositions can be formulated to avoid the VOC-containing solvent systems of liquid coating compositions and offer an opportunity to avoid the VOC content associated with liquid coating compositions.

Any powder coating composition contemplated for use as a military coating must presently comply with U.S. Department of Defense Military Specification MIL-PRF-32348 entitled Powder Coating, Camouflage Chemical Agent Resistant Systems ("MIL-PRF-32348") which is incorporated herein by reference in its entirety. At present, MIL-PRF-32348 Type III covers powder coatings for use on metallic substrates. MIL-PRF-32348 Type III requires that the powder coating must be a chemical-agent-resistant coating. Such chemical-agent-resistant coatings are referred to by the acronym "CARC". Representative chemical agents against which the coating must be resistant include GD and HD agents. In addition, the powder coating must be free of VOCs, and must be compliant with stringent requirements for color and reflectance, hiding power, specular gloss, infrared reflectance, and other properties and capabilities.

Various powder coating compositions have been developed in an effort to meet MIL-PRF-32348. However, none of these powder coatings have been developed for use as topcoats (i.e., paints) for coating a broad range of objects including vehicles (e.g., wheeled and tracked vehicles, aircraft, ships, etc.), machinery, equipment, buildings, and other structures and articles. There are presently no powder coating compositions for use as a topcoat or primer which are compliant with MIL-PRF-32348 Type III.

Existing powder coating compositions fail to comply with MIL-PRF-32348 Type III because such coating compositions do not provide a finished-form film which includes the combination of weather-resistance, resistant to adsorption of chemical agents, and a surface appearance with the requisite low gloss and sheen. In a topcoat or camouflage coating, it is particularly important that the surface have a matte-appearance with low levels of gloss and sheen because light reflectance, or glare, from the coating surface can result in unwanted detection of the coated article. Avoidance of detection of the coated article is particularly important in military applications involving motor vehicles, aircraft, weapons, and other devices.

In general, three different approaches have been used to control gloss and sheen in existing powder coating compositions. These three approaches have included use of fillers, waxes, and differential cure techniques. While generally useful at controlling light reflection, each approach has certain disadvantages, making them unsuitable for compliance with MIL-PRF-32348 Type III.

Fillers, such as barium sulfate or glass beads, have been utilized to reduce gloss and sheen. Such fillers limit gloss and sheen by reducing the microscopic smoothness of the finished-form coating, thereby scattering light and reducing light reflectance. While fillers are effective at controlling gloss and sheen, fillers have certain disadvantages. Since the filler level necessary to achieve the low gloss and sheen reaches or exceeds the critical pigment volume concentration (CPVC) of the coating, flow is restricted, resistance to environmental exposure is negatively affected, chemical-agent resistance is negatively affected, and interference with flow during spray application occurs because of the high specific gravity of the filler.

Hydrocarbon and fluorocarbon waxes are also used to reduce the gloss and sheen of powder coatings. These waxes limit gloss by forming a surface layer with reduced gloss and sheen. The surface layer is formed when the wax melts during heating of the powder coating on the article and migrates to the coating/air interface where the surface layer is formed. A disadvantage of waxes is that the wax softens the coating surface thereby reducing resistance of the finished-form film to marring, staining, and chemical-agent attack.

Differential cure involves the use of incompatible resins, meaning that the resins have different structures or are catalyzed with different catalysts. Differential cure is particularly effective with powder coating compositions including polyester and acrylic blends. Upon incomplete molecular mixing, such as is typically encountered in a powder coating extruder, these differential-cure systems result in the development of zones of varying shrinkage or varying surface tension on the coating surface during curing. This yields a microscopically-rough surface layer which scatters light and reduces light reflectance. A shortcoming of differential cure is that the incompatible resins may negatively affect the properties of the finished-form film such as impact resistance, marring, staining, resistance to chemical-agent attack, flexibility, and tensile strength.

It would be an improvement in the art to provide powder coating compositions which could be formulated to provide a durable, weather-resistant finished-form film surface with a matte-appearance, which could be formulated in a more environmentally-friendly manner, which could be formulated for compliance with current military specifications including chemical-agent resistance, and which would be economical and easy to apply using conventional powder coating techniques.

SUMMARY

The present inventors seek to solve the problem of providing matte-appearance, chemical-agent-resistant powder coating compositions which, in certain embodiments, can be formulated for compliance with MIL-PRF-32348, including MIL-PRF-32348 Type III. Powder coating compositions of the types described herein can be formulated for multiple different uses such as for use as a topcoat or primer. Powder coating compositions can be formulated to provide a finished-form film with a 60° gloss of about 3 or less, an 85° sheen of about 8 or less, and chemical-agent resistance compliant with MIL-PRF-32348.

In embodiments, a matte-appearance chemical-agent-resistant powder coating composition comprises a resin component, a polyisocyanate-containing uretdione cross-linking agent, catalyst, and a flattening agent. Other constituents may be added as described herein.

In embodiments, the powder coating composition comprises 100 parts of the resin component. Preferably, the resin component comprises a hydroxyl-containing resin having a hydroxyl number of at least about 100, a glass transition temperature (Tg) of at least about 48° C. and a hydroxyl-containing halogenated copolymer resin having a hydroxyl number of at least about 40 and a Tg of at least about 48° C.

The polyisocyanate-containing uretdione cross-linking agent is preferably provided in a range relative to the resins of the resin component. The range may be based on a ratio of the isocyanate groups of the polyisocyanate-containing uretdione cross-linking agent to the hydroxyl groups of the resin component as represented by the total of the hydroxyl numbers of the resins comprising the resin component. Preferably, the polyisocyanate-containing uretdione cross-linking agent is in an amount sufficient to provide a molar ratio of the isocyanate groups to a total of the resin hydroxyl numbers of about 0.8 to about 1.8.

The catalyst is preferably provided in an amount of about 0.1 PHR to about 5 PHR. The flattening agent is preferably provided in an amount of about 0.1 PHR to about 4.5 PHR.

Preferably, the hydroxyl-containing resin is selected from the group consisting of polyester resins, acrylic resins, and combinations of polyester and acrylic resins. Preferred polyester resins may include hydroxyl-containing polyesters having (a) a molecular weight of about 4000 to 20000, (b) an acid value of about 2 to about 11 mg KOH/g, (c) a Tg of about 48° C. to 80° C., and (d) a hydroxyl number of about 100 to about 350 mg KOH/g. The polyester resins may comprise hydroxyl-terminated branched polyester resins. Preferred hydroxyl-containing acrylic resins may have a molecular weight of about 13,000 to 17,000, a Tg of about 48° C. to 62° C., and a hydroxyl number of about 90 to about 350 mg KOH/g.

In embodiments, the hydroxyl-containing halogenated copolymer resin is preferably a hydroxyl-containing fluoro-copolmer. A preferred hydroxyl-containing fluorocopolmer may have (a) a molecular weight of about 8,000 to 16,000, (b) a Tg of about 48° C. to 62° C., and (c) a hydroxyl number of about 40 to about 110 mg KOH/g. Fluoro alkyl vinyl ether copolymer resins are preferred. Fluoroethylene alkyl vinyl ether copolymer resins, known as FEVE resins, are highly preferred. In embodiments, the FEVE resins may comprise various repeating units such as (a) cyclohexyl vinyl ether, (b) fluoroolefin, (c) alkyl vinyl ether, and (d) hydroxyalkyl vinyl ether.

In embodiments, the hydroxyl-containing resin and hydroxyl-containing halogenated copolymer resins of the resin component may be provided in a ratio of about 20 to about 80 parts by weight of the hydroxyl-containing resin and about 20 to about 80 parts by weight of the hydroxyl-containing halogenated copolymer resin. More preferably, the hydroxyl-containing resin and hydroxyl-containing halogenated copolymer resins of the resin component may be provided in a ratio of about 35 to about 70 parts by weight of the hydroxyl-containing resin and about 30 to about 65 parts by weight of the hydroxyl-containing halogenated copolymer resin. A highly preferred ratio is about 60 parts by weight of the hydroxyl-containing resin and about 40 parts by weight of the hydroxyl-containing halogenated copolymer resin.

In embodiments, the polyisocyanate-containing uretdione cross-linking agent is a cyclic aliphatic uretdione. Preferably, the cyclic aliphatic uretdione is an adduct of isophorone diisocyanate. Numerous other cross-linking agents may be utilized.

A catalyst for use in formulating powder coating composition embodiments of the types described herein may include organometallic compounds, quaternary ammonium hydroxides, quaternary ammonium fluorides, quaternary phosphonium hydroxides, and ammonium carboxylate compounds. Combinations of catalysts may be used.

A wide range of flattening agents may be utilized in embodiments of the powder coating compositions. Examples of flattening agents include polytetrafluoroethylene (PTFE), clay, magnesium silicate, polypropylene, polyethylene, beeswax, lanolin, lanocerin, shellac, ozokerite, paraffin, carnauba, candellila, jojoba, ouricouri, montan, fatty acid amides, polyamides, alkali alumino silicate ceramic microspheres, and alumino silicate glass microspheres or flakes. PTFE is a particularly preferred flattening agent. Combinations of flattening agents may be utilized.

Other constituents which may be included in powder coating embodiments include pigments, acid scavengers, flow aids, degassing agents, and UV light stabilizers.

Methods of manufacture and articles coated with the matte-appearance, chemical-agent-resistant powder coating compositions are within the scope of the invention.

DETAILED DESCRIPTION

Exemplary matte-appearance, chemical-agent-resistant powder coating compositions, methods of making the powder coating compositions, and applications of such powder coating compositions will now be described in detail with respect to the detailed description and examples which follow. The preferred embodiments described herein are not intended to be exhaustive or to limit the invention to the precise forms disclosed. The section headings provided herein are for convenience only and are not intended to limit the scope of the invention in any way.

Definitions

"A" or "an" means one or more.

"About" means approximately or nearly, and in the context of a numerical value or range set forth herein, means±10% of the numerical value or range recited or claimed.

"Admix" means to mix or blend.

"Aliphatic" means or refers to saturated or unsaturated nonaromatic hydrocarbon compounds in which the constituent carbon atoms can be straight-chain, branched chain, or cyclic.

"Antireflective" appearance means or refers to a matte-appearance and/or reduced reflectance of the complete spectrum of light, including low levels of infra-red and/or ultra violet components of the light spectrum.

"Aromatic" means or refers to any of a large class of organic compounds whose molecular structure includes one or more planar rings of atoms usually, but not always, six carbon atoms.

"Copolymer" means or refers to any polymer synthesized from two or more different monomers using various polymerization techniques. For example, each of (1) polyester made from a dicarboxylic acid, a diol and phosphoric acid and (2) a polyester made from a dicarboxylic acid and a diol is a copolymer.

"CPVC" means or refers to critical pigment volume concentration. CPVC is defined as the volume fraction of pigment in the cured powder coating composition for which there is sufficient binder to provide a complete adsorbed layer on the surfaces of the pigment particles and to fill all the interstices between the random and closely packed pigment particles in the cured powder coating composition.

"Cure" or "curing" means or refers to the process wherein a hard thermoset coating is formed as a result of the cross-linking reaction between the reactive groups of the various coating constituents.

A "finished-form film" means, or refers to the film produced by the powder coating following curing.

"Glass transition temperature" or "Tg" of any resin or (co)polymer is measured using a Differential Scanning calorimeter (DSC) (rate of heating of 20° C. per minute), the Tg being taken at the midpoint of the inflection of the Thermogram. Tg may alternatively be calculated for copolymers and polymeric blends as described by Fox in the Bulletin of American Physics Society Vol. 1, Issue 3, page 123 (1956).

"Hydroxyl number" means or refers to the weight of potassium hydroxide (KOH) in milligrams corresponding to the hydroxyl groups in a 1 gram sample of a polyol.

"Matte-appearance" or "matte-finish" means or refers to an appearance which is generally dull, having low levels of gloss and/or sheen. It is desirable, but not required, that a matte-appearance or finish have a gloss, taken at an angle of 60°, of about 3 or less and a sheen, taken at an angle of 85°, of about 8 or less.

"Molecular weight" means or refers to the weight average molecular weight of a polymer.

The phrase "parts per hundred parts resin" or "PHR" means or refers to an assigned value of 100 for the mass of the resin component of the composition with all other constituents given as a fraction of the mass of the resin component.

"Polymer" means or refers to large molecules with repeating smaller molecules known as monomers. A combination of one or more monomeric unit can also result in the formation of a (co)polymer. As used herein, the terms "polymer" and "resin" are interchangeable.

"Polyol" means or refers to any organic compound having two or more hydroxyl or active hydrogen groups such as, for example, diols and triols.

"Polyisocyanate" means or refers to an isocyanate containing polymeric adduct with more than one reactive isocyanate group.

As used herein, the term "wt. %" means or refers to percent by weight.

In general, matte-appearance and antireflective chemical-agent-resistant ("CARC") powder coating compositions of the types described herein can be formulated to yield tough, durable finished-form films with desirable properties and characteristics, such as weather-resistance, resistant to adsorption of chemical agents, and a surface appearance with low-levels of gloss and sheen. A powder coating composition which has a finished-form film which is antireflective represents a type or subset of matte-appearance powder coating compositions, but with a lower level of light reflectance than a powder coating composition with a matte-appearance or finish. It is envisioned that such properties and characteristics of matte-appearance powder coating compositions will have particular value in connection with coating military equipment, such as wheeled and tracked vehicles, weapons, machinery, and other objects, although use of the powder coating compositions in civilian applications is certainly within the scope of the invention.

Matte-appearance chemical-agent-resistant powder coating compositions of the types described herein provide the formulator, applicator, and end user with an opportunity for compliance with MIL-PRF-32348 including an antireflective appearance and resistance to chemical agents as required by such specification. Such powder coatings represent CARC coatings. Matte-appearance chemical-agent-resistant powder coating compositions can be formulated, for example, to provide resistance to chemical agents such as GD agents (i.e., nerve agents) and HD agents (i.e., vesicant agents). Such resistance prevents damage to the surfaces and components of the coated equipment. In addition, military equipment coated with matte-appearance chemical-agent-resistant powder coating compositions of the types described herein can be quickly and effectively decontaminated using conventional decontamination procedures so that the equipment can be rapidly returned to service. While chemical agents such as GD and HD are specifically discussed herein, it is anticipated that the powder coating compositions can be formulated to have resistance to agents other than GD and HD chemical agents.

Matte-appearance chemical-agent-resistant powder coating compositions can be formulated which yield a finished-form film having a gloss (taken at an angle of 60°) of about 3 or less and a sheen (taken at an angle of 85°) of about 8 or less while not compromising the toughness and durability of the finished-form film of the coating which could occur with coatings utilizing conventional flattening agents of the types described previously. Matte-appearance chemical-agent-resistant powder coating compositions can also be formulated which yield a finished-form film having a 60° gloss of about 1.6 or less and an 85° sheen of about 4.0 or less. In yet other embodiments, matte-appearance chemical-agent-resistant powder coating compositions can be formulated which yield a finished-form film having a 60° gloss of about 0.6 or less and an 85° sheen of about 1.0 or less.

These matte-appearance properties enable the formulator to make powder coatings having a wide range of colors while still maintaining low levels of light reflectance. For example, tan and sand color powder coating composition can be formulated with a 60° gloss of about 1.6 or less and an 85° sheen of about 4.0 or less and an aircraft black color powder coating composition can be formulated with a 60° gloss of about 0.6 or less and an 85° sheen of about 1.0 or less.

Matte-appearance coatings with gloss and sheen values of the type described herein are compliant with the requirements of MIL-PRF-32348 Type III and are suitable for use as camouflage coatings and for other military applications. Coating compositions with 60° gloss and 85° sheen values greater than 3 and 8 respectively, while not compliant with the aforementioned military specification, are within the scope of the invention.

Matte-appearance chemical-agent-resistant powder coating compositions may be used as topcoats over an epoxy primer (preferably P1410WEE-1 available from Hentzen Coatings, Inc. of Milwaukee, Wis.) or may be applied directly to the substrate without a primer.

Matte-appearance chemical-agent-resistant powder coating compositions may be formulated for other applications. For example, powder coating compositions can be formulated for use as a primer substrate compliant with MIL-PRF 32348 Type I for liquid topcoats. By way of further example, powder coating compositions can be formulated for use as a topcoat compliant with MIL-PRF 32348 Type IV for application to articles such as tool boxes, ammunition boxes, casings, and the like where stringent chemical-agent resistance is of lesser importance.

Matte-appearance chemical-agent-resistant powder coating compositions may be provided to the applicator in the form of an easy-to-use, single-component powder coating composition which may be applied using conventional powder coating equipment and techniques. Because the compositions as described herein are powder coating compositions, they may be formulated without VOC-containing solvents of the type required by liquid coating compositions. Accordingly, matte-appearance chemical-agent-resistant powder coating compositions as described herein provide an opportunity for much more environmentally-friendly coating products.

Exemplary Hydroxyl-Containing Resins

A preferred resin component for use in matte-appearance chemical-agent-resistant powder coating compositions includes 100 parts resin. Preferably, the resin component comprises a hydroxyl-containing resin having a hydroxyl number of at least about 100 and a glass transition temperature (Tg) of at least about 48° C. and a hydroxyl-containing halogenated copolymer resin having a hydroxyl number of at least about 40 and a Tg of at least about 48° C. Examples of suitable hydroxyl-containing resins are polyester resins and acrylic resins. Combinations and mixtures of the resins may be utilized.

Hydroxyl-containing polyester resins of the present invention comprise the reaction product of one or more polyol and one or more polyacid. Suitable polyester resins used according to the invention may be branched, although branching is not required. Suitable polyester resins may also include hydroxyl-terminated components, with hydroxyl functionality on the polymer backbone being more preferred.

Such polyester resins are typically solids at room temperature with a Tg of about 48° C. or greater and, more preferably, with a Tg in the range of about 48° C. to about 80° C. Even more preferably, the Tg is in the range of about 48° C. to about 68° C. and most preferably, the Tg is in the range of about 48° C. to about 62° C. An acid value of about 2 to about 11 mg KOH/g is preferred for the hydroxyl-containing polyester resins.

The melting point or solidification point of the hydroxyl-containing polyester may preferably be in the range from about 50° C. to about 150° C., and, more preferably, is in the range of from about 50° C. to about 100° C. The molecular weight of the hydroxyl-containing polyester resins used in the embodiments may range of from about 4,000 to about 20,000, most preferably in the range of about 1,000 to about 5,000.

Hydroxyl-containing polyester resins may have a hydroxyl number of about 100 to about 350 mg KOH/g. A more preferred hydroxyl number range is about 250 to about 350 and a more highly preferred hydroxyl number range is about 280 to about 320.

Hydroxyl-containing polyester resins are typically provided in flake form and are easily admixed with other constituents of the matte-appearance chemical-agent-resistant powder coating compositions as described herein.

Suitable polyester resins containing hydroxyl groups for use according to the invention include reaction products of polyhydric alcohols (preferably dihydric, and most preferably optionally trihydric and higher alcohols) with polybasic (preferably dibasic) polycarboxylic acids or anhydrides thereof, or corresponding polycarboxylic acid esters of lower alcohols. Combinations and mixtures of alcohols and polyacids may be utilized.

Suitable polyhydric alcohols include ethylene glycol, 1,2- and 1,3-propanediol, 1,4- and 2,3-butanediol, 1,6-hexanediol, 1,10-decanediol, neopentyl glycol, 1,4-bis(hydroxymethyl)-cyclohexane, 2-methyl-1,3-propanediol, glycerol, trimethylolpropane, 1,2,6-hexanetriol, pentaerythritol, quinitol, mannitol, sorbitol, formitol or formose, methyl glycoside, di-, tri- and tetraethylene glycols, propylene glycols, and butylene glycols. Combinations and mixtures of the alcohols may be utilized. Preferably, the selected polyol contains no β-hydrogen, such as neopentyl glycol (NPG).

Polycarboxylic acids, polycarboxylic acid anhydrides, and polycarboxylic acid esters used in the synthesis of exemplary polyester resins may include aliphatic, cycloaliphatic, aromatic, araliphatic, and/or heterocyclic polycarboxylic acids and may optionally be substituted (for example, by halogen atoms), although they may also be unsaturated. Examples of such carboxylic acids and derivatives thereof are adipic acid, sebacic acid, azelaic acid, dodecanedioic acid, phthalic acid, isophthalic acid, tetrahydrophthalic anhydride, trimelleticanhydride, tetrachlorophthalic anhydride, endomethylene tetrahydrophthalic anhydride, glutaric anhydride, maleic anhydride, fumaric acid, dimerized and trimerized unsaturated fatty acids, terephthalic acid dimethyl ester, and terephthalic acid bis-glycol ester. Combinations and mixtures may be utilized.

Acrylic resins are another type of hydroxyl-containing resin which may be utilized separately or in combination with other types of hydroxyl-containing polyester resins in matte-appearance (and antireflective) chemical-agent-resistant powder coating compositions. Hydroxyl-containing acrylic resins may contain from about 10 to 75 parts by weight of hydroxyalkyl esters of acrylic or methacrylic acid (for example HEMA), 0 to 80 parts by weight of styrene and/or α-methylstyrene, and about 10 to 90 parts by weight of an acrylic and/or methacrylic acid ester (for example butly acrylate, methyl methacrylate).

Preferably, hydroxyl-containing acrylic resins have a molecular weight of about 13,000 to 17,000, a Tg of about 48° C. to 62° C., and a hydroxyl number of about 90 to about 350 mg KOH/g.

Exemplary Hydroxyl-Containing Halogenated Copolymer Resins

The preferred resin component for use in the matte-appearance chemical-agent-resistant powder coating compositions preferably further includes a hydroxyl-containing halogenated copolymer resin. A halogenated copolymer resin generally refers to a fluorine, chlorine, bromine, and/or iodine substituent on the polymer backbone. Representative copolymers are obtained by copolymerizing a completely or partially halogenated alkyl molecule with various monomeric/oligomeric polymer units to obtain desired end application properties. Typically, the halogen substituents are located on the main polymer chain; however, modifications on side chains may be utilized.

Fluoroolefin polymers or copolymers are particularly preferred halogenated copolymer resins. Fluoroolefins synthesized by the fluorination of typical alkanes, alkene and alkynes may be used in the synthesis of fluoroolefin polymers or copolymers used to formulate the powder coating compositions.

Fluoroolefin copolymers which may be used in the present invention typically comprise repeating units derived from at least one fluoroolefin and at least one unsaturated monomer which does not contain a halogen. The addition of a fluoroolefin to the main polymer backbone as a branch is also considered a fluorinated copolymer suitable for use in the powder coating compositions. One or more fluorine substituents may be on either the main polymer backbone, or on one or more side chains (branches) attached to the main polymer backbone, or on both the backbone and side chains. Such fluorocopolymers may be prepared by conventional free-radical addition polymerization processes (e.g., by polymerization in aqueous emulsion, in aqueous suspension, in solution, or in bulk).

A fluoroolefin is broadly defined herein as an olefin having at least one fluorine atom substituent; often the fluoroolefin is a perhaloolefin in which all the hydrogen atoms of the olefin are substituted with fluorine atoms and, optionally, other halogen atoms. Examples of such fluoroolefins include fluoroethylenes such as $CF_2=CF_2$, $CHF=CF_2$, $CH_2=CF_2$, $CH_2=CHF$, $CClF=CF_2$, $CCl_2=CF_2$, $CClF=CClF$, $CHF=CCl_2$, $CH_2=CClF$, and $CCl_2=CClF$. Other suitable fluoroolefins include fluoropropylenes such as $CF_3CF=CF2$, $CF_3CF=CHF$, $CF_3CH=CF2$, $CF_3CH=CF2$, $CF_3CF=CHF$, $CHF_2CHCHF$, and $CF_3CH=CH_2$.

Of such representative fluoroethylenes and fluoropropylenes listed above, tetrafluoroethylene ($CF_2=CF_2$), chlorotrifluoroethylene ($CClF=CF_2$), vinylidene fluoride ($CH_2=CF_2$), and hexafluoropropylene ($CF_2=CFCF_3$) are preferred. The use of the above exemplified fluoroolefins either singly or in admixture is of course included within the scope of the present invention. From the point of view of polymerizability and resulting polymer properties, fluoroolefins having 2 or 3 carbon atoms are preferable.

The most preferred class of halogenated copolymers that may be used in the resin component of the present invention are curable fluoro alkyl vinyl ether copolymer resins. Preferably, the fluoro alkyl vinyl ether copolymer resins have a hydroxyl number of about 40 to about 60. Fluoro alkyl vinyl ether resins typically are comprised of monomers such as (but not limited to) fluoroolefin units, cyclohexyl vinyl ether units, alkyl vinyl ether units, and hydroxyalkyl vinyl ether units. The monomer concentrations and type included in the fluorocopolymer resin can vary depending on the desired properties such as hardness, manufacturability, flexibility, adhesion, etc. For example, high concentrations of fluoroolefin units can be difficult to manufacture. And, low concentrations of cyclohexyl vinyl ether units can result in poor hardness of the finish in the cured coating. In a typical example of a fluoro alkyl vinyl ether copolymer resin, the perhaloolefins used may be chlorotrifluoroethylene or tetrafluoroethylene. Alkyl vinyl ethers used may comprise of C2-C8 straight or branched alkyl groups. Hydroxyalkyl vinyl ethers may be hydroxybutyl vinyl ether in addition to cyclohexyl vinyl ethers.

A particularly preferred fluoro alkyl vinyl ether copolymer resin is generically known as fluoroethylene alkyl vinyl ether copolymer resin, known by the acronym FEVE. FEVE resins are also referred to herein as fluorocopolymers. The fluoroethylene alkyl vinyl ether FEVE copolymer resins may comprise repeating units of cyclohexyl vinyl ether, fluoroolefin, alkyl vinyl ether, and hydroxyalkyl vinyl ether. No particular sequence of these units is required.

FEVE fluorocopolymer resins possess particularly desirable properties (e.g., excellent durability, weather-resistance, chemical and thermal resistance, stain resistance and gloss). FEVE fluorocopolymer resins are known to have material-shedding properties which are thought to limit adherence of chemical agents to the finished-form film. Other hydroxyl-containing halogenated copolymer resins may include such properties. FEVE fluorocopolymer resins are available from AGC Chemicals Americas, Inc., for example under the trade name Lumiflon® L710F.

Preferably, hydroxyl-containing fluorocopolymers have a molecular weight of about 8,000 to 16,000, a Tg of about 48° C. to 62° C., and a hydroxyl number of about 40 to about 110 mg KOH/g.

Hydroxyl-containing halogenated copolymer resins are typically provided in flake form and are easily admixed with other constituents of the matte-appearance chemical-agent-resistant powder coating compositions as described herein.

The preferred resin component for use in the matte-appearance chemical-agent-resistant powder coating compositions comprises a combination of the hydroxyl-containing resin and hydroxyl-containing halogenated copolymer resin. Combinations and mixtures of resin types may be utilized. For example, a polyester resin and acrylic resin could be utilized with a hydroxyl-containing halogenated copolymer resin. Other resins could be added to the resin component to provide the finished-form film with the desired properties.

The resins of the resin component are preferably in a ratio of about 20 to about 80 parts by weight of the hydroxyl-containing resin and about 20 to about 80 parts by weight of the hydroxyl-containing halogenated copolymer resin. The ratios are established based on weight percent with the sum equaling 100. The 100 parts resin establishes the basis of the resin component with all other constituents being provided relative to the resin component and referred to as parts per hundred resin (PHR). More preferably, the resins are in a ratio of about 35 to about 70 parts by weight of the hydroxyl-containing resin and about 30 to 65 parts by weight of the hydroxyl-containing halogenated copolymer resin. A highly-preferred range of the resins is a ratio of about 60 parts by weight of the hydroxyl-containing resin and about 40 parts by weight of the hydroxyl-containing halogenated copolymer resin.

Exemplary Cross-Linking Agents

Polyisocyanate-containing uretdione cross-linking agents (also referred to as cross-linkers, hardeners, or curing agents) may be used in the present powder coating compositions to cross-link with the hydroxyl-containing resins or resin combinations to form a highly cross-linked network comprising urethane or carbamate linkages. The polyisocyanate-containing uretdione cross-linking agents preferably contain uretdione groups which ring open to yield reactive isocyanate groups. Such polyisocyanate-containing uretdione polymer adducts may be derived from aliphatic or cycloaliphatic isocyanates. The polyisocyanate-containing uretdione cross-linking agents are typically polymer adducts with a uretdione content of about 3 percent by weight to about 18 percent by weight. A typical polyisocyanate-containing uretdione cross-linking agent may further include a free isocyanate content of less than about 5 percent by weight.

Generally, the uretdiones of the polyisocyanate-containing uretdione cross-linking agents are the result of the dimerization of isocyanates in the presence of dimerization catalysts. Typically, a broad range of polyisocyanates may be used to synthesize polyisocyante-containing uretdiones. Non-limiting examples of such polyisocyanates include isophorone diisocyanate (IPDI), hexamethylene diisocyanate (HDI), 2,2'-dicyclohexyl-methane diisocyanate/2,4'-dicyclohexyl-methane diisocyanate/4,4'-dicyclohexyl-methane diisocyanate (H12MDI), 2-methylpentane diisocyanate (MPDI), 2,2, 4-tri-methylhexamethylene diisocyanate/2,4,4-trimethylhexamethylene diisocyanate (TMDI), norbornane diisocyanate (NBDI) alone, or in combinations and mixtures, may be used. Aliphatic polyisocyanate-containing uretdiones such as IPDI, $H_{12}$MDI and HDI are particularly preferred because they exhibit exceptional exterior durability and weather resistance. Typical examples of dimerization catalysts used in the synthesis of polyisocyanate-containing uretdiones may include, without limitation, trialkylphosphines, dialkylaminopyridines, or imidazoles and combinations thereof.

Isocyanate functional groups of the uretdione cross-linking agents react with any active hydrogen-containing compound to form urethanes or carbamates. The reaction between the active hydrogens in the hydroxyl-containing resins and the isocyanate functional groups in the uretdione cross-linking agents used in the present embodiments results in formation of a highly cross-linked, 2 dimensional or 3 dimensional, network. The cross-linked network may consist of a combination of the hydroxyl-containing resin and hydroxyl-containing halogenated copolymer resin.

Without wishing to be bound by any particular theory, it is thought that the cross-linked combination of the hydroxyl-containing resin and hydroxyl-containing halogenated copolymer resin contribute to provide the chemical-agent resistance to GD and HD agents. It is believed that the GD and HD chemical agents are not extensively adsorbed onto the resultant finished-form film. Because the GD and HD chemical agents are not securely bound to the finished-form film, the vehicle, article, or part can be readily decontaminated.

The amount of polyisocyanate-containing uretdione cross-linking agent provided in the matte-appearance and antireflective chemical-agent-resistant powder coating compositions may be determined based on the molar ratio of the isocyanate groups of the polyisocyanate-containing uretdione to the total hydroxyl groups of the resins, as represented by the hydroxyl numbers of each resin of the resin component. As used herein, a total of the resin hydroxyl numbers refers to the sum of the resin hydroxyl numbers and this represents the total hydroxyl group content per mole of resin.

An isocyanate group means or refers to reactive isocyanate groups associated with the polyisocyanate-containing uretdione cross-linking agent. The isocyanate groups may also be expressed as a weight percent of the polyisocyanate-containing uretdione cross-linking agent. For example, Crelan EF-403 IPDI polyisocyanate-containing uretdione cross-linking agent (Bayer Material Science) has a uretdione content of about 6.75 wt. %, an isocyanate content of about 13.5 wt. % (i.e., about two isocyanate groups per uretdione molecule), a free isocyanate content of less than 1.0, and a functionality of about 1.9.

Typically, the greater the ratio of isocyanate groups in the uretdione cross-linking agent relative to the total hydroxyl groups of the resin component (represented by the hydroxyl number), the greater the cross-linking density of the resultant polymeric network. The use of isocyanate groups in excess of the total hydroxyl number ensures that all available hydroxyl groups are cross-linked for maximum density. Any excess isocyanate groups are believed to react with water and other constituents to strengthen mechanical properties of the finished-form film. The polyisocyanate-containing uretdione cross-linking agent and hydroxyl-containing resins of the resin component can be selected so that the molar ratio of the isocyanate groups and total hydroxyl groups provide the desired extent of cross-linking yielding a finished-form film with the properties deemed useful for a given application.

Preferably, the polyisocyanate-containing uretdione is in an amount sufficient to provide a molar ratio of isocyanate groups to the total hydroxyl groups of the resins (as represented by the hydroxyl number) of about 0.8 to about 1.8. A preferred ratio is about 0.8 to about 1.2.

The ratio may be determined according to the following formula for a 100 PHR batch. In this example, the total hydroxyl number of the resins is assumed to be 140 and the isocyanate equivalence of the uretdione cross-linking agent is assumed to be 310 or 13.5 percent by weight. A ratio of the isocyanate groups to the total hydroxyl number of 0.8 would require 61.89 PHR of the polyisocyanate-containing uretdione cross-linking agent determined as follows:

$$\left( \frac{\frac{100 \text{ parts resin (hydroxy}l\ \#\ 140)}{56100 \text{ mg } KOH}}{140 \text{ mg (polyester hydroxyl number)}} \right) \times 0.8 \frac{\text{equivalence}}{\text{parts}(NCO)} \times$$

$$310 \frac{\text{parts}}{\text{equivalence}} (\text{polyisocyante-containinguretdione}) =$$

$$61.89 \text{ parts polyisocyante-containing uretdione}$$

A ratio of the isocyanate groups to the total hydroxyl number of 1.8 would require 139.25 PHR of the polyisocyanate-containing uretdione cross-linking agent according to the formula.

In embodiments, the polyisocyanate-containing uretdione cross-linking agent is a cyclic aliphatic uretdione. Preferably, the cyclic aliphatic uretdione is an adduct of isophorone diisocyanate. Numerous other cross-linking agents may be utilized.

Exemplary coating compositions may be cured under conditions known to cleave the uretdione ring resulting in the reaction between the isocyanate groups of the uretdione and the available active hydrogen atoms of the resin component. Reaction temperatures may depend on the catalyst used, when a catalyst is optionally used. Typical reaction temperatures for a catalyzed opening of the uretdione ring are in the range of from about 100° C. to about 205° C. substrate temperature. In other embodiments, the reaction may be carried out at a temperature of from about 120° C. to about 180° C. substrate temperature, or at a temperature of from about 150° C. to about 175° C. substrate temperature, or at a substrate temperature of from about 80° C. to about 110° C.

Exemplary Catalysts

Preferably, one or more catalyst is provided to increase the reaction rate at which the polyisocyanate-containing uretdione ring is opened to expose the reactive isocyanates for cross-linking with the hydroxyl groups of the resins. Exemplary catalysts which may be included in the powder coating composition for the uretdione ring opening are organometallic catalysts, quaternary ammonium hydroxides, quaternary ammonium fluorides, quaternary phosphonium hydroxides, and ammonium carboxylate compounds (e.g., tetraalkyl ammonium carboxylate compounds). Catalyst combinations may be utilized. Preferred organometallic catalysts include metal acetylacetonates, metal hydroxides, and metal alkoxides such as zinc(II) acetylacetonate, calcium acetylacetonate, magnesium acetylacetonate, aluminum(III) acetylacetonate, zirconium(IV) acetylacetonate, and aluminum(III) acetylacetonate. Combinations and mixtures of these catalysts may be used.

Examples of suitable quaternary ammonium hydroxides, quaternary ammonium fluorides quaternary phosphonium hydroxides, and ammonium carboxylate compounds include tetramethylammonium benzoate, tetrabutylammonium acetate, tetrabutylphosphonium benzoate, methyltributyl ammonium hydroxide, tetramethylammonium fluoride, tetramethylammonium chloride, tetramethylammoniumbromide, benzyl trimethyl ammonium hydroxide, benzyltriethylammonium, tetramethylammonium fluoride, tetraethylammonium, tetrabutyl ammonium acetate, and tetraethyl ammonium phosphate. Combinations and mixtures of these catalysts may be used.

The catalyst or catalysts may be incorporated directly with the other constituents of the powder coating compositions during the mixing stage prior to extrusion. The catalyst is preferably added in an amount of about 0.1 PHR to about 5.0 PHR of the resin component. The catalyst can also be used as a masterbatch made by predispersing the catalyst in a resin such as hydroxyl functional polyester PCCR 3110 or filler such as barium sulphate and fumed silica to improve in dispersion. Masterbatch catalysts would be used at the corresponding higher amount based on the active amount of catalyst in the masterbatch.

A preferred catalyst is Crekat XP 2571 supplied by Bayer Material Science. Crekat XP 2571 is a 25-33% zinc acetylacetonate masterbatch in a hydroxyl polyester. Crekat XP 2571 masterbatch can be used in the powder coating composition at amounts from about 0.3 PHR to about 16.0 PHR because the catalyst is a fraction of the masterbatch.

Persons of skill in the art will appreciate that the appropriate catalyst or catalysts and the amount of catalyst can be selected to achieve the desired reactivity and the desired gloss and sheen in the finished-form film provided by the matte-appearance chemical-agent-resistant powder coating compositions.

In general, the curing (i.e., reaction), of the matte-appearance chemical-agent-resistant powder coating compositions can be carried out at a substrate temperature of about 100° C. to about 205° C.

Exemplary Flattening Agents

A flattening agent, also referred to herein as a matting agent, is preferably provided as a constituent of the matte-appearance chemical-agent-resistant powder coating compositions. The flattening or matting agent is useful to impart desired properties of low gloss and sheen to the finished-form film resulting in a matte-appearance or antireflective appearance. Embodiments of matte-appearance chemical-agent-resistant powder coating compositions can be formulated to produce a finished-form film exhibiting a 60° gloss of about 3 or less and an 85° sheen of about 8 or less. Lower levels of gloss and sheen can be provided in the finished-form film as previously described (e.g., a 60° gloss of about 0.6 or less and an 85° sheen of about 1.0 or less for an aircraft black color). In addition, levels of gloss and sheen greater than 3 and 8 respectively are contemplated depending on the needs of the end user.

A flattening agent typically encompasses a large range of natural and synthetic materials. They may include, for example, high fatty esters (typically C36-C50) or polymers with molecular weights ranging from 700-10,000. Combinations of flattening agents may be utilized.

The mechanism by which the flattening agent functions varies by the type of flattening agent used. Typically, most natural waxes take advantage of the phase incompatibility between the resin system and the wax to bloom to the surface and re-crystallize. In another common mechanism known as the ball bearing mechanism, the solid particles migrate to the surface as individual particles and act as physical spacers by protruding above the coating resulting in a reduction in gloss or appearance of a texture.

Many flattening or matting agents may be utilized separately and in combination. Non-limiting examples of natural flattening agents may include beeswax, lanolin, lanocerin, shellac, ozokerite, paraffin, carnauba, candellila, jojoba, ouricouri, and montan. Other flattening agents can include polyethylene (PE), polypropylene (PP), polytetrafluoroethylene (PTFE), fatty acid amide, and polyamides. Blends and modifications of the aforementioned polymeric materials may be utilized as the flattening agent. Yet other flattening agents which may be used include, without limitation, alkali alumino silicate ceramic microspheres, alumino silicate glass microspheres or flakes, polyolefin waxes in combination with the salt of an organic anion, polymeric wax additives, or a combination of such constituents.

Synthetic waxes are highly preferred flattening agents. Examples include micronized polyolefin waxes and fluorinated polyolefin waxes, especially polytetrafluoroethylene (PTFE) and PTFE blends. PTFE-based flattening agents may include chemically modified PTFE, PTFE blends with polyolefin wax mixtures, PTFE/talc mixtures and PTFE/clay mixtures and combinations thereof. In certain embodiments, the PTFE powder additives are granular powders with a particle size from about 5 to about 1,000 microns in median particle size (d50) and with a melting point in the range of about 63° C. to about 321° C.

The flattening agent may be provided in amounts as necessary to impart the desired gloss and sheen to the finished-form film. Military applications may require lower levels of gloss and sheen than civilian applications and, therefore, the type and amount of flattening agent may be selected to impart the desired matte appearance. In embodiments, the flattening or matting agent comprises about 0.1 PHR to about 4.5 PHR of the matte-appearance and antireflective chemical-agent-resistant powder coating compositions, with about 2.9 PHR to about 4 PHR being a more preferred range.

Without wishing to be bound by any particular theory, a synergistic relationship is thought to exist between the catalyst, polyisocyanate-containing uretdione cross-linking agent, and flattening agent. The catalyst opens the uretdione ring structure at lower temperatures. This, in turn, enables the formulator to reduce the amount of flattening agent added to the powder coating. Reduction of flattening agent provides for a coating composition which avoids exceeding the critical volume pigment concentration (CPVC). Exceeding the CPVC is a problem with known flattening agents and is thought to interfere with resistance of existing powder coating compositions to chemical agents. By avoiding exceeding of the CPVC, matte-appearance chemical-agent-resistant powder coating compositions can be formulated with improved chemical-agent resistance.

Exemplary Pigments

One or more pigment is preferably provided as a constituent of the matte-appearance (and antireflective) chemicalagent-resistant powder coating compositions. The pigments are selected to impart the desired color to the finished-form film produced by the matte-appearance chemical-agent-resistant powder coating composition. In embodiments, the pigments are selected to meet MIL-PRF-32348 Type III and the infra-red spectra requirement thereof.

Color-imparting pigments comprising organic pigments, inorganic pigments, or a combination thereof, may be included to alter the appearance of the powder coated articles as required. Examples of inorganic pigments include metal oxides such as titanium dioxide, micronized titanium dioxide, and mixed metal oxide pigments such as chromium iron oxide, chromium oxide, iron oxide hydroxides, cobalt chromite green spinel, ferrous feric oxide, iron (III) oxide, magnesium oxide, red oxides, and yellow oxides. Exemplary organic pigments include carbon black, azopigments phthalocynin pigments.

The pigment concentration will vary depending on the color selected for the finished-form coating. For example, black-colored coatings will require relatively lesser concentrations of pigment whereas a tan color will require relatively greater pigment concentrations. By way of example, a pigment or pigments can comprise from about 1 PHR (e.g., for a carbon black pigment) to about 150 PHR (e.g., for pigments providing a tan color). In addition to achieving the desired color, the pigment selection for the camouflage colors can conform to the desired spectral reflectance limits to simulate the reflectivity of chlorophyll in the visible portion of the electromagnetic spectrum of 400 nm to 700 nm. Persons of skill in the art will determine the pigment loading as required to formulate the powder coating compositions.

Exemplary Fillers

One or more filler is optionally provided as a constituent of the matte-appearance and antireflective chemical-agent-resistant powder coating compositions. If included, the filler or fillers are used as inert constituents which can modify gloss, sheen, hardness, and reduce cost.

Representative non-limiting examples of fillers include barium sulfate, magnesium silicate, silicon dioxide, alumino silicates, anhydrous sodium potassium alumino silicate, wollastonite, and calcium carbonate. Fillers may be used separately or in combination with other fillers.

In embodiments, the filler or fillers may comprise about 1 PHR to about 150 PHR of the matte-appearance chemical-agent-resistant powder coating compositions. The filler and pigment constituents preferably do not exceed about 150 PHR, or about 34 weight percent, in order to avoid exceeding the CPVC. Fillers are a direct replacement for pigments on a weight basis. Preferably, the filler and pigment may be adjusted to provide about 34 weight percent of the total powder coating composition.

Exemplary Acid Scavengers

One or more acid scavenger is optionally provided as a constituent of the matte-appearance chemical-agent-resistant powder coating compositions. The acid scavenger consumes the acid functionality of the binder system. This, in turn, improves, the functionality of the catalyst to open the polyisocyanate-containing uretdione cross-linking agent ring structure at lower temperatures. Reduction of the acid functionality coupled with improved catalyst functionality enables the formulator to reduce the level of flattening agent. Reduction of flattening agent provides for a coating composition which avoids exceeding the critical volume pigment concentration (CPVC) as described above. Therefore, inclusion of an acid scavenger improves the efficiency of the catalyst which aids in avoiding the CPVC which, in turn, is thought to improve the chemical-agent resistance of the finished-form film. Inclusion of an acid scavenger is highly preferred for powder coating composition including polyester resins because of the acid content of such resins, but is less preferred for powder coating compositions including acrylic resin because of the lack of acid content.

Acid scavengers may include epoxide-functional resins such as triglycidyl isocyanurate (TGIC) compounds or derivatives thereof. Preferred derivatives of TGIC based resins have a number average molecular weight in the range of about 290 to about 500 and an equivalent weight of at least about 90 to about 110 grams per equivalent glycidyl group with a melting point of about 88° C. to about 98° C. Specific examples of such derivatives include methyl substituted triglycidyl isocyanurate (TGIC), ethyl substituted triglycidyl isocyanurate, glycidal methyl methacrylate epoxy, and hydroxyl alkylamides (HAA) such as Primid XL-522.

The acid scavenger may be present in an amount of at least about 2 PHR and, more preferably, about 0.6 PHR to about 1.6 PHR.

Exemplary Additives

Matte-appearance chemical-agent-resistant powder coating compositions may include other additives and constituents to impart desired properties to the finished-form film produced by the powder coating material. Examples may include flow aids, degassing additives, and ultra-violet (UV) light stabilizers. Modified polyacrylate flow aids such as Resiflow P-67 and the degassing additive benzoin from Estron Chemical, Inc. of Calvert City, Ky. are examples.

A flow aid, also referred to as a leveling agent, may be provided to facilitate dispersion, particularly during extrusion of the constituents during manufacture. In embodiments, the flow aid comprises from about 1 PHR to about 5 PHR of the powder coating composition. Other embodiments may include about 2.3 PHR to about 3.7 PHR of the powder coating composition. Preferably, the flow aid is a modified polyacrylate. Polyacrylates are polymers or co-polymers of esters of methacrylic and acrylic acids. A useful flow aid is Resiflow P-67. Other flow aids and leveling agents include Estron Resiflow PL200 and Estron P-65, as well as Modaflow 2000 from Monsanto Company.

A degassing agent constituent is preferably provided to avoid off gassing which can occur during the curing and heating process and result in formed-in bubbles in the coating. Degassing agents allow for release of volatile gases in a molten powder coating film and accelerate the rate of gas bubble shrinkage. In embodiments, the degassing agent may comprise from about 1 PHR to about 5 PHR of the powder coating composition. In other embodiments, the degassing agent comprises about 1.4 PHR to about 2 PHR of the powder coating composition. A preferred degassing agent is benzoin. The benzoin may be 2-hydroxy-1,2-diphenyl ethanone with a molecular weight of 212.2.

Other additives, such as, UV light stabilizers and thermal stabilizers, may be added to powder coating composition in amounts of about 1 to about 10 PHR. Examples of UV light stabilizers include UV absorbers such as Benzotriazole (available from Ciba as Tinuvin 900 or 928), hindered amine light stabilizers (available from Ciba as Tinuvin 144 or Tinuvin 662), and heat stabilizers such a triphenyl phosphite (available from Ciba as Irgafos 168 or XP40).

Exemplary Constituent Sources

Hydroxyl-containing polyester resins which may be used in formulating matte-appearance chemical-agent-resistant powder coating compositions include Polymac 3110 available from PCCR USA of Carpentersville, Ill. Polymac 3110 is a highly branched hydroxyl-terminated polyester resin with a viscosity of 2,100 to 3,000 m pascals at 200° C., an acid value of 11 mg KOH/g, Tg of 48° C., and a hydroxyl value of 290 mg KOH/g.

Other suitable branched hydroxyl-containing polyester resins include Albester Silky Matte 3115 and 6615 available from Momentive of Sant'Albano, Italy. Albester Silky Matte 3115, is a highly branched hydroxyl-terminated polyester resin with a viscosity of 2,100 to 3,000 m pascals at 200° C., an acid value of 7-11 mg KOH/g, a Tg of 48° C., and a hydroxyl value of 290 mg KOH/g. Albester Silky Matte 6615 is a highly branched hydroxyl-terminated polyester resin with a viscosity of 2,500 to 3,500 m pascals at 200° C., an acid value of 6 mg KOH/g, a Tg of 53° C., and a hydroxyl number of 280 mg KOH/g.

EL 1900, manufactured by Sun Polymers International Inc. of Mooresville, Ind. is another suitable hydroxyl-containing polyester resin which may be utilized. EL-1900 is a hydroxyl-terminated polyester resin with a viscosity of 2,000 to 4,500 m pascals at 165° C., an acid value of less than 10 mg KOH/g, a Tg of 62° C., and a hydroxyl number of 280 to 320 mg KOH/g.

Cytec of Anderlecht Belgium provides hydroxyl-terminated polyester resins under the trade names Crylcoat E04076 and 2814-0 which may be utilized. Crylcoat E04076 is a hydroxyl-terminated polyester resin with a viscosity of 4,000 m pascals at 200° C., an acid value of 5 mg KOH/g, Tg of 60° C., and a hydroxyl number of 240 mg KOH/g. Crylcoat 2814-0 is a hydroxyl-terminated polyester resin with a viscosity of 2,500 to 4,000 m pascals at 200° C., an acid value of 14 mg KOH/g, a Tg of 52° C., and a hydroxyl number of 300 mg KOH/g.

Yet another source of hydroxyl-containing polyester resins is Bayer Material Science LLC of Pittsburgh, Pa. which provides Rucote 108, Rucote 109 and Rucote 117. Rucote 108 is a hydroxyl-terminated polyester resin with a viscosity of 3,500 m pascals at 200° C., an acid value of 2 mg KOH/g, a Tg of 53° C., and a hydroxyl value of 295 mg KOH/g. Rucote 109 is another hydroxyl-terminated polyester resin. Rucote 109 has a viscosity of 2500 m pascals at 200° C., an acid value of 8 mg KOH/g, a Tg of 55° C., and a hydroxyl number of 265 mg KOH/g. Rucote 117 is a hydroxyl-terminated polyester resin with a viscosity of 4000 m pascals at 200° C., an acid value of 2 mg KOH/g, a Tg of 58° C., and a hydroxyl value of 110 mg KOH/g.

Joncryl 587 is an example of a hydroxyl containing acrylic resin with a hydroxyl number of 94, a Tg of 50° C. and a molecular weight of 18,000. Joncryl 587 is available from BASF of Wyandotte, Mich.

Fluorocopolymer FEVE resins which may be used in formulating matte-appearance chemical-agent-resistant powder coating compositions include Lumiflon L710F, Lumiflon L916F, Lumiflon L200F and Lumiflon EXP L available from AGC Chemicals Americas, Inc. of Exton, Pa.

Lumiflon L710F is a hydroxyl-containing fluorocopolymer FEVE resin made of alternating fluoroethylene and alkyl vinyl ether segments. Lumiflon L710F has specification values for weight percent solids of 98.5% minimum, an acid value of 0 mg KOH/g, a Tg of 51.5° C. *minimum*, and a hydroxyl number range of 40-52 mg KOH/g. Lumiflon L710F has a specific gravity of 1.4 g/cm$^3$.

Lumiflon L916F is a low molecular weight, high hydroxyl-containing fluorocopolymer FEVE resin also made of alternating fluoroethylene and alkyl vinyl ether segments. Lumiflon L916F has typical property values for weight percent solids greater than 99%, a Tg of 34° C., and a hydroxyl number of 100 mg KOH/g. Lumiflon L916F has a specific gravity of 1.39 g/cm$^3$.

Lumiflon L200F is a moderate molecular weight, hydroxyl-containing fluorocopolymer FEVE resin also made of alternating fluoroethylene and alkyl vinyl ether segments. Lumiflon L200F has typical property values for weight percent solids greater than 98%, a Tg of 35° C., and a hydroxyl number of 45 mg KOH/g. Lumiflon L200F has a specific gravity of 1.42 g/cm$^3$.

Lumiflon EXP-36 is a hydroxyl-containing fluorocopolymer FEVE resin made of alternating fluoroethylene and alkyl vinyl ether segments. Lumiflon EXLP-36 has specification values for weight percent solids of 99% minimum, an acid value of 0 mg KOH/g, a Tg of 50° C. *minimum*, and a hydroxyl number of 52 mg KOH/g.

Representative polyisocyanate-containing uretdione cross-linking agents include Crelan EF 403 available from Bayer Material Science LLC of Pittsburgh, Pa. and Vestagon BF 1540, Vestagon BF 1320, and Vestagon EP-BF 1321 which are available from Evonik Corporation of Parsippany, N.J.

Representative catalysts include CreKat XP 2571 (a hydroxyl functional catalyst masterbatch) available from Bayer Material Science LLC of Pittsburgh, Pa. and Vestagon EP-SC 5050 available from Evonik Corporation.

Representative examples of flattening agents can include the Lanco™ series of micronized wax surface modifiers and PowderAdd™ products surface modifiers both available from Lubrizol Corporation of Wickliffe, Ohio. PowderAdd™ 9085 is a specific example. Other flattening or matting agents which may be used include Powdertex™ matting agents available from Shamrock of Newark, N.J., the PTFE flattening agent SynFlow 283TX from Micro Powders, Inc. of Tarrytown, N.Y. G and N series ceramic microspheres available from Zeeospheres Ceramics, LLC of Lockport, La. and glass bubbles and ceramic microspheres available from 3M Corporation of St. Paul, Minn. may be utilized.

There are many commercial sources of pigments. Representative pigments can include TR-93 titanium dioxide from Huntsman Chemicals of The Woodlands, Tex., Meteor Plus Brown 9770, Sicopal Brown K 2795 FG (chromium iron oxide pigment with a Brown 29 color index), manufactured by BASF of Ludwigshafen, Germany, and Heucodur Brown 855 and 869 (chromium iron oxide brown powder, with a pigment Brown 29 color index) manufactured by Heubach of Germany. G8599, Chromium Oxide Green (chrome oxide camouflage grade dark green pigment) and YL02288 Ferrispec Yellow Iron Oxide (iron oxide yellow) both available from Rockwood Pigments Inc. of East St. Louis, Ill. may be utilized. GEODE V12600 Camo Green, manufactured by Ferro Corporation of Cleveland, Ohio, is a cobalt chromite with a color index (CI) of pigment green 26. This pigment is designed to simulate the spectral reflectance curve of chlorophyll which is a key attribute in meeting military camouflage requirements.

The flow aid P-67 is available from Estron Chemical as previously stated.

The degassing agent, Benzoin is available from Estron Chemical and GCA Chemical Corporation of Houston, Tex.

Other degassing additives include Estron Chemical's Oxymelt A-4 and Oxymelt A-6, and Powderadd 542 DG from Troy Chemical Company of Florham Park, N.J.

TGIC is available from Changzhou Niutang Chemical Plant Co., China.

Exemplary Methods of Manufacture

Exemplary matte-appearance chemical-agent-resistant powder coating compositions are preferably prepared by means of a batch process, although continuous manufacturing processes may be utilized. The constituents for a given batch are first selected based on the particular coating required. The selected constituents are preferably pre-weighted.

Next, the pre-weighted constituents are premixed. The constituents include hydroxyl-containing resin (e.g., polyester resin), hydroxyl-containing halogenated copolymer (e.g., FEVE fluorocopolymer resin), polyisocyanate-containing uretdione cross-linking agent (e.g., a cycloaliphatic polyuretdione hardener), catalyst (e.g., a hydroxyl-functional catalyst masterbatch), and other constituents such as flattening agent, pigment, filler, acid scavenger, flow aids and degassing agents, are premixed. The constituents are preferably premixed in a Henshel® Mixer (Henshel America, Inc., Green Bay, Wis.) at 3600 RMS for a duration of approximately 30 seconds. Preferably, all constituents are combined in the mixer before activation of the mixer. No particular mixing order is required. The result is a premixed batch.

It is preferred that the premixed batch is next melt mixed. The premixed batch may be melt mixed in a 30 mm Baker Perkins twin screw extruder (Baker Perkins Inc., Grand Rapids, Mich.) at 400 RPMS with a feed rate of approximately 85-95 lbs./hr. using a volumetric feeder (Schenck AccuRate, Whitewater, Wis.). Preferably, the extruder zones are set at the following temperatures: extruder temperature zone 1 set at approximately 40° C., extruder zone 2 set at approximately 150° C., and extruder zone 3 set at approximately 150° C.

Next, the extrusion product may be cooled into a ribbon using a chill roll. The chill roll may be a Model S-824 available from Strand Manufacturing of Hopkins, Minn.

Following cooling, the cooled extrusion product may be pulverized using, for example, a Bantum Mill (Hosokowa Micron Corp., Summit, N.J.) with a No. 3465 screen or a Retsch® ZM 1000 Ultra Centrifugal Mill with a 12 pin rotor spinning at 1800 RPMs and using a 0.25 screen.

The pulverized product may then be sieved to provide the finished matte-appearance chemical-agent-resistant powder coating composition. A 120 mesh screen may be used. Other sieve sizes may be utilized based on the needs of the end user.

For a Tan 686A coating, the preferred particle size to maintain a 60° gloss minimum of about 1.6 is a mean particle size of about 65 to about 70 microns. For a Green 383 coating, the preferred particle size to maintain a 60° gloss minimum of about 1.2 is a mean particle size of about 65 to about 70 microns.

Exemplary Methods of Application

An advantage of exemplary matte-appearance chemical-agent-resistant powder coating compositions is that they may be applied to a substrate, article, or part using conventional fusion coating processes including electrostatic spraying, fluidized bed coating, water slurry, hot flocking and thermal spray techniques. For example, coating compositions may be applied to the substrate, article, or part using an electrostatic corona charge application. In such electrostatic coating application processes embodiments, the coating compositions are electrostatically applied to a film thickness, preferably of about 2.5 mils to about 5.5 mils, although other thicknesses may be utilized. The coating compositions may be cured on the substrate or part for a suitable time and at a suitable temperature. For example, coating compositions may be cured in a conventional oven for about 15 to about 30 minutes at a substrate temperature of about 100° C. to about 205° C. It is intended that articles and objects coated with powder coating compositions as described herein are within the scope of the invention.

Without wishing to be bound by any particular theory, it is believed that the hydroxyl-containing resin and the halogenated copolymer resin, also having hydroxyl-containing functional groups, react with the isocyanate groups of the uretdione cross-linking agent to form urethane (and carbamate) linkages in a two- or three-dimensional polymer network. Additionally, the glycidyl groups present in the preferred acid scavenger or TGIC, will react with residual carboxyl groups on the preferred hydroxyl-containing polyester resin remaining during the manufacture of such hydroxyl-containing polyester resin.

The reaction is thought to serve two functions. First, the carboxyl groups on the chain and the three glycidyl groups on the preferred TGIC molecule react forming ether bonds between the resin chains. During this reaction, secondary hydroxyl groups are formed in the resin network from protonation of the epoxide ring in the glycidyl group. These secondary hydroxyl groups can further react with the isocyanate groups formed from the ring opening of the polyisocyanate-containing uretdione cross-linking agent. Relatively less flattening agent can be used to achieve the desired low levels of gloss and sheen because of the theorized synergistic relationship between the catalyst, polyisocyanate-containing uretdione cross-linking agent, and flattening agent. Use of reduced levels of flattening agent is believed to avoid the CPVC and to contribute to improved chemical-agent resistance.

Second, scavenging the carboxyl groups or acid functionality on the resin chain, allows the catalyst to cleave the uretdione ring at substrate temperatures at about 100° C. to about 205° C. The formation of this dense cross-linked network in the cured film can achieve chemical resistance to GD and HD chemical agents.

It is thought that the material-shedding properties of the hydroxyl-containing halogenated copolymer resin contribute to reduced adherence of chemical agents to the finished-form film. The improved chemical resistance protects articles (e.g., wheeled and tracked vehicles, weapons, machinery, and other objects) coated with powder coating compositions from damage by the chemical agents and permits any chemical agent to be removed from the coated article using conventional decontamination techniques permitting the coated article to be quickly returned to service.

EXAMPLES

Exemplary matte-appearance chemical-agent-resistant powder coating compositions are further described in connection with the following non-limiting examples.

Examples 1-7

Exemplary matte-appearance chemical-agent-resistant powder coating compositions were evaluated for quality of the matte-appearance and chemical-agent resistance. Examples 2-7 illustrate that matte-appearance chemical-agent-resistant powder coating compositions can be formulated to have low levels of gloss and sheen together with properties indicative of chemical-agent resistance compliant with MIL-PRF-32348.

Example 1 is provided as a comparative example and is not a composition according to the invention. Example 1 represents an excellent powder coating composition including a resin fraction including carboxyl polyester resin and glycidyl methacrylate. Example 1 was of a green color known as Green 383, according to federal standard 595C 34094.

Examples 2-7 represent exemplary matte-appearance chemical-agent-resistant powder coating compositions in accordance with the invention. The exemplary compositions of Examples 2-7 each comprise a resin fraction including hydroxyl-containing polyester resin and a hydroxyl-containing halogenated copolymer resin. The hydroxyl number of the polyester resin of Examples 5-7 is greater than the hydroxyl number of the polyester resin of Examples 2-4.

The powder coating compositions of Examples 2-7 were formulated in Tan 686A or Green 383 colors as indicated in Tables 3A-3B and 5A-5B. The coatings of Examples 2-7 could be applied to many different objects such as helicopters, fixed-wing aircraft, on and off road vehicles, and parts generally. Observations regarding antireflective properties and properties indicative of chemical-agent resistance for each of Examples 2-7 are provided.

Samples of each of Examples 1-7 were formulated in accordance with the method of manufacture described above. Each composition of Examples 1-7 was in the form of a dry, free flowing powder suitable for application to a substrate using conventional electrostatic powder coating apparatus.

Each powder coating composition was applied to a "coupon" substrate using an electrostatic spraying process. The coupons were 2 inch diameter circles and were made of a steel sheet material.

After formulation, each powder coating composition was electrostatically charged and applied to a coupon in a spray booth. Each coated coupon was removed from the spray booth and heated in a convection oven until the coating was melted and cured. Heating time ranged from 10 to 15 minutes at a substrate temperature of about 190.5° C. The finished-form coating on each coupon substrate had a thickness of generally between about 1.8 to about 5 mils (0.0018 inch to 0.005 inch) after cooling as noted in the following examples.

Observations with respect to gloss and sheen were made as recorded and noted in each example. The gloss measurements were taken using a Byk Instruments glossmeter (Byk Instruments, Norwalk, Conn.) at an angle of 60 degrees to the coating surface and the sheen measurements were taken with the glossmeter at an angle of 85 degrees to the coating surface.

Chemical-agent resistance was determined by laboratory testing with GD and HD agents (Examples 1-2). The compositions of Examples 2-7 were also tested by a methyl ethyl ketone (MEK) solvent rub process in accordance with ASTM D5402-06 (Revision 6 2011) which was used to determine that the finished-form film had properties indicative of resistance to GD and HD chemical agents.

Chemical agent testing is a measure of coating desorption from a coated article after the coated article is exposed to GD and HD chemical agents. In essence, the chemical agent test evaluates the ability of the coating surface to shed the GD and HD chemical agents during a decontamination process. MIL-PRF-32348 Section 3.6.10 requires that the finished-form film shall desorb a maximum of 40 µg of GD chemical agent (nerve agent) and a maximum of 180 µg of HD chemical agent (vesicant agent). The testing for the GD and HD chemical-agent resistance in Examples 1 and 2 for compliance with the aforementioned Section 3.6.10 was performed in accordance with the procedures of MIL-PRF-32348 Section 4.6.19.4.

The MEK rub process simulates contact with GD and HD chemical agents. ASTM D4758-03 requires 50 back-and-forth motions of an MEK saturated swab over the coating (i.e., "double rubs" or 100 single strokes). Visual observations were made of whether the coating had been removed or degraded by the MEK according to Table 1 in ASTM D4758-03. Numerical valuations ranging from 1 to 5 were assigned with 5 being the best performance and 1 being the poorest performance. Resistance to MEK in the rub process is indicative that the coating composition would be resistant to GD and HD chemical agents and, therefore, compliant with MIL-PRF-32348 Type III. In Examples 3-7, the MEK rub process was used as a proxy for actual GD and HD chemical agent testing.

Flexibility of the powder coating compositions of Examples 1-7 was evaluated by a mandrel bend test in accordance with ASTM D522 Method B. Flexibility allows the coating to bend, flex, and resist damage providing a more complete barrier to chemical agents which could damage the substrate to which the coating is applied. For purposes of the mandrel bend test, each powder coating composition was applied to a 0.010 inch thick steel panel using the electrostatic spraying process as described above. The coated panel was then hand-bent across a mandrel having a diameter of 0.25 inch and qualitative observations were made of the coating. Coatings were determined to "pass" the test if no cracks were observed or were determined to "fail" if at least some cracks were observed.

Tables 1, 3A-3B and 5A-5B provide the pre-weighted constituents in grams, weight percent, parts per hundred resin (PHR) and control code.

Example 1

Table 1 presents the constituents of comparative Example 1. Table 2 presents the test results for the compositions of Example 1.

TABLE 1

| | | | Example 1 Green 383 2107-2 | | |
|---|---|---|---|---|---|
| No. | Constituent/Source | Description | Amount (grams) | Wt % | PHR |
| 1 | Polyester resin Uralac P835 DSM Coating Resins, Augusta, GA | Carboxyl polyester with an acid value 20-24 mg KOH/g | 23186.16 | 51.117 | 78.16 |

TABLE 1-continued

| | | | Example 1 Green 383 2107-2 | | |
|---|---|---|---|---|---|
| No. | Constituent/Source | Description | Amount (grams) | Wt % | PHR |
| 2 | GMA acrylic curing agent Isocryl 570 Estron Chemical Inc., Calvert City, KY | Glycidyl methacrylate (GMA) with an epoxy equivalent weight of 535-625 or 26.5% - 22.7% GMA | 6478.63 | 14.283 | 21.84 |
| 3 | Flow Aid P67 Estron Chemical Inc., Calvert City, KY | Acrylic polymer flow aid | 272.15 | 0.600 | 0.92 |
| 4 | Pigments Ferro Corporation, Cleveland, OH Rockwood Pigments Inc., East St. Louis, IL Heubach, GmbH BASF, GmbH | Chromium oxide, Iron oxide hydroxides, Cobalt Chromite Green Spinel, iron (III) oxide, Magnesium oxide | 15422.06 | 34.00 | 51.99 |
| | Total | | 45359.00 | 100.00 | 152.91 |

TABLE 2

Example 1 Results

| No. | Property | Example 1 |
|---|---|---|
| 1 | Curing Time and Substrate Temperature | 15 min. @ 190.5° C. |
| 2 | Film Thickness (mils) | 2.0-3.0 mils |
| 3 | 60° Gloss | 0.8 |
| 4 | 85° Sheen | 2.2 |
| 5 | Mandrel Bend | 1/4" pass |
| 6 | Film thickness for Mandrel Bend | 1.8-2.5 mils |
| 7 | 50 MEK double rubs | Rating: 1 |
| 8 | Chemical Agent | Fail - GD and HD |

The coating produced by the composition of comparative Example 1 had a matte-appearance or finish with desirable low levels of gloss and sheen and flexibility. However, the coating of comparative Example 1 deteriorated when rubbed with MEK, resulting in a "1" rating, the lowest rating on the 1-5 scale. The coating of comparative Example 1 was also laboratory tested and failed both GD and HD chemical agent testing. The coating of comparative Example 1 is not compliant with MIL-PRF-32348 Type III.

Examples 2-4

Tables 3A and 3B present the constituents of Examples 2-4. Table 4 presents the test results for the compositions of Examples 2-4.

TABLE 3A

| | | | Example 2 Tan 686A 3607-24 | | | Example 3 Green 383 3655b-33 | | |
|---|---|---|---|---|---|---|---|---|
| No. | Constituent/ Source | Description | Amount (grams) | Wt % | PHR | Amount (grams) | Wt % | PHR |
| 1 | Polyester resin Albester 3110 PCCR USA, Carpentersville, IL | Hydroxyl polyester with a hydroxyl value 240-310 mg KOH/g and maximum acid value of 10 mg KOH/g | 7393.52 | 16.30 | 59.99 | 5311.54 | 11.71 | 35.00 |
| 2 | Fluorocopolymer Lumiflon LF-710F, AGC Chemicals Americas, Inc. Exton, PA | Fluoroethylene and alkyl vinyl ether copolymer FEVE resin with a hydroxyl value of 46 ± 6 mg KOH/g and an acid value of 0. | 4930.52 | 10.87 | 40.01 | 9865.58 | 21.75 | 65.00 |
| 3 | Acid scavenger Niutang TGIC Changzhou Niutang Chemical Plant Co., China | Triglycidal isocyanurate (1,3,5-Triglycidyl isocyanurate) CAS No. 2451-62-9 | 158.76 | 0.35 | 1.29 | 104.33 | 0.230 | 0.69 |
| 4 | Cross-linking agent Crelan EF403 Bayer Material Science LLC Pittsburgh, PA | Blocking agent free cycloaliphatic polyuretdione hardener with an equivalent weight of 310 or 13.5% NCO content | 15667.00 | 34.54 | 127.13 | 13072.46 | 28.82 | 86.13 |
| 5 | Catalyst CreKat XP 2571 Bayer Material Science LLC Pittsburgh, PA | Hydroxyl functional catalyst masterbatch with zinc content of approx. 8% and 25-33% zinc acetylacetonate (CAS No. 14024-63-6). (Active catalyst) | 653.17 (261.27) | 1.44 (0.58) | 5.30 (2.12) | 544.31 (217.72) | 1.20 (0.48) | 3.59 (1.44) |

TABLE 3A-continued

|  |  |  | Example 2 Tan 686A 3607-24 | | | Example 3 Green 383 3655b-33 | | |
| --- | --- | --- | --- | --- | --- | --- | --- | --- |
| No. | Constituent/ Source | Description | Amount (grams) | Wt % | PHR | Amount (grams) | Wt % | PHR |
| 6 | Flow Aid P67 Estron Chemical Inc., Calvert City, KY | Acrylic polymer flow aid | 453.59 | 1.00 | 3.68 | 362.87 | 0.80 | 2.39 |
| 7 | Degassing agent Benzoin Estron Chemical Inc., Calvert City, KY | Benzoin CAS No. 119-53-9 | 226.80 | 0.50 | 1.84 | 226.80 | 0.50 | 1.49 |
| 8 | Flattening agent SynFlow 283TEX Micro Powders Inc. Terrytown, NY | Synthetic parafin (CAS No 8002-74-2) with Polytetra Fluoroethylene (CAS No. 9002-84-0) blend. | 453.59 | 1.00 | 3.68 | 453.59 | 1.00 | 2.99 |
| 9 | Pigments TR93, Huntsman International, LLC, Houston, TX | Titanium Dioxide (CAS No. 1308-38-9) | 11886.78 | 26.21 | 96.45 | *** | *** | *** |
| 10 | Ferro Corporation, Cleveland, OH Rockwood Pigments Inc., East St. Louis, IL Heubach, GmbH BASF, GmbH | Chromium iron oxide. Chromium oxide, Iron oxide hydroxides | 3535.28 | 7.79 | 28.69 | *** | *** | *** |
| 11 | Ferro Corporation, Cleveland, OH Rockwood Pigments Inc., East St. Louis, IL Heubach, GmbH BASF, GmbH | Chromium oxide. Iron oxide hydroxides, Cobalt Chromite Green Spinel, iron (III) oxide. Magnesium Oxide | *** | *** | *** | 15422.06 | 34.00 | 101.61 |
|  | Total |  | 45359.00 | 100.00 | 368.05 | 45363.54 | 100.00 | 289.89 |

TABLE 3B

|  |  |  | Example 4 Green 383 3655b-26 | | |
| --- | --- | --- | --- | --- | --- |
| No. | Constituent/Source | Description | Amount (grams) | Wt % | PHR |
| 1 | Polyester resin Albester 3110, PCCR USA of Carpentersville, IL | Hydroxyl polyester with a hydroxyl value 240-310 mg KOH/g and maximum acid value of 10 mg KOH/g | 8060.29 | 17.77 | 69.99 |
| 2 | Fluorocopolymer Lumiflon LF-710F, AGC Chemicals Americas, Inc. of Exton, PA | Fluoroethylene and alkyl vinyl ether copolymer FEVE resin with a hydroxyl value of 46°6 mg KOH/g and an acid value of O. | 3456.36 | 7.62 | 30.01 |
| 3 | Acid scavenger Niutang TGIC Changzhou Niutang Chemical Plant Co., China | Triglycidal isocyanurate (1,3,5-Triglycidyl isocyanurate) CAS No. 2451-62-9 | 172.36 | 0.38 | 1.50 |
| 4 | Cross-linking agent Crelan EF403 Bayer Material Science LLC of Pittsburgh, PA | Blocking agent free cycloaliphatic polyuretdione hardener with an equivalent weight of 310 or 13.5% NCO content | 16515.21 | 36.41 | 143.40 |
| 5 | Catalyst CreKat XP 2571, Bayer Material Science LLC of Pittsburgh, PA | Hydroxyl functional catalyst masterbatch with Zinc content of approx. 8% and 25-33% zinc acetylacetonate (CAS No. 14024-63-6). (Active catalyst) | 684.92 (273.97) | 1.51 (0.60) | 5.95 (2.38) |
| 6 | Flow Aid P-67 Estron Chemical Inc., Calvert City, KY | Acrylic polymer flow aid | 362.87 | 0.80 | 3.15 |

TABLE 3B-continued

| | | | Example 4 Green 383 3655b-26 | | |
|---|---|---|---|---|---|
| No. Constituent/Source | Description | Amount (grams) | Wt % | PHR | |

| No. | Constituent/Source | Description | Amount (grams) | Wt % | PHR |
|---|---|---|---|---|---|
| 7 | Degassing agent Benzoin Estron Chemical Inc., Calvert City, KY | Benzoin CAS No. 119-53-9 | 226.80 | 0.50 | 1.97 |
| 8 | Flattening agent SynFlow 283TEX, Micro Powders Inc. Terrytown, NY | Synthetic parafin (CAS No 8002-74-2) with Polytetra Fluoroethylene (CAS No. 9002-84-0) blend. | 453.59 | 1.00 | 3.94 |
| 9 | Pigments TR93, Huntsman International, LLC, Houston, TX | Titanium Dioxide (CAS No. 1308-38-9) | *** | *** | *** |
| 10 | Pigments Ferro Corporation, Cleveland, OH Rockwood Pigments Inc., East St. Louis, IL Heubach, GmbH BASF, GmbH | Chromium oxide, iron oxide hydroxides, Cobalt Chromite Green Spinel, iron (III) oxide, and Magnesium oxide | 15422.06 | 34.00 | 133.91 |
| | Total | | 45354.46 | 100.00 | 393.82 |

TABLE 4

Examples 2-4 Results

| No. | Property | Example 2 | Example 3 | Example 4 |
|---|---|---|---|---|
| 1 | Curing Time and Substrate Temperature | 15 min. @ 190.5° C. | 15 min. @ 190.5° C. | 15 min. @ 190.5° C. |
| 2 | Film Thickness (mils) | 2.3-2.6 mils | 4.5-5.5 mils | 2.9-3.6 mils |
| 3 | 60° Gloss | 1.6 | 1.6 | 1.5 |
| 4 | 85° Sheen | 1.3 | 1.2 | 1.5 |
| 5 | Mandrel Bend | 1/4" pass | 1/4" pass | 1/4" pass |
| 6 | Film Thickness for Mandrel Bend | 2.0-3.5 mils | 3.5-4.0 mils | 3.5-4.0 mils |
| 7 | 50 MEK double rubs | Rating: 5 | Rating: 5 | Rating: 5 |
| 8 | Chemical Agent | Pass-GD and HD | * * * | * * * |

As indicated by the PHR values, the range of hydroxyl-containing polyester resin to hydroxyl-containing halogenated copolymer FEVE resin (determined by weight) was 35:65 (Example 3), 60:40 (Example 2), and 70:30 (Example 4). The molar ratio of the isocyanate groups of the polyisocyanate-containing uretdione cross-linking agent to the total hydroxyl number of the resins was 1.2 (Examples 2 and 4) and 1.15 (Example 3), thereby representing an excess of isocyanate groups relative to the available hydroxyl groups of the resin component.

The finished-form films produced by the coating compositions of Examples 2-4 had gloss and sheen values, respectively, not exceeding 1.6 which are well within the maximum values of 3.0 (gloss) and 8.0 (sheen) specified by MIL-PRF-32348 Type III. Flexibility was excellent; no cracking was observed during the mandrel bend test (ASTMD522 Method B).

The powder coating composition of Example 2 was laboratory tested for resistance to both GD and HD chemical agents and was determined to be compliant with MIL-PRF-32348 Type III for both GD and HD chemical-agent resistance. The coatings of Examples 2-4 were subjected to the MEK double rub test used as a proxy for actual GD and HD chemical-agent resistance and each example earned the highest "5" rating. The MEK resistance of both Examples 3 and 4 is indicative of compliance with MIL-PRF-32348 Type III for both GD and HD chemical agent resistance. Examples 2-4 represent matte-appearance chemical-agent-resistant powder coating compositions with chemical agent characteristics fully compliant with MIL-PRF-32348 Type III.

Examples 5-7

Tables 5A and 5B present the constituents of Examples 5-7. Table 6 presents the test results for the compositions of Examples 5-7.

TABLE 5A

| | | | Example 5 Tan 686A 3607b-50 | | | Example 6 Tan 686A 3607b-51 | | |
|---|---|---|---|---|---|---|---|---|
| No. | Constituent/ Source | Description | Amount (grams) | Wt % | PHR | Amount (grams) | Wt % | PHR |
| 1 | Polyester resin EL-1900 | Hydroxyl polyester with a hydroxyl value 280-320 mg KOH/g and maximum acid value of 10 mg KOH/g | 8595.53 | 18.950 | 69.75 | 3492.64 | 7.700 | 23.01 |

TABLE 5A-continued

| | | | Example 5 Tan 686A 3607b-50 | | | Example 6 Tan 686A 3607b-51 | | |
|---|---|---|---|---|---|---|---|---|
| No. | Constituent/ Source | Description | Amount (grams) | Wt % | PHR | Amount (grams) | Wt % | PHR |
| 2 | Fluoroco-polymer Lumiflon LF-710F AGC Chemicals Americas, Inc., Exton, PA | Fluoroethylene and alkyl vinyl ether copolymer FEVE resin with a hydroxyl value of 46 ± 6 mg KOH/g and an acid value of 0. | 2150.02 | 4.740 | 17.45 | 13970.57 | 30.800 | 92.05 |
| 3 | Cross-linking agent Crelan EF403 Bayer Material Science LLC, Pittsburgh, PA | Blocking agent free cycloaliphatic polyuretdione hardener with an equivalent weight of 310 or 13.5% NCO content | 17159.31 | 37.83 | 139.23 | 10813.59 | 23.84 | 71.25 |
| 4 | Catalyst CreKat XP 2571 Bayer Material Science LLC, Pittsburgh PA | Hydroxyl functional catalyst masterbatch with zinc content of approx. 8% and 25-33% zinc acetylacetonate (CAS No. 14024-63-6). (Active catalyst) | 712.14 (284.86) | 1.57 (0.63) | 5.78 (2.31) | 449.05 (179.62) | 0.99 (0.40) | 2.96 (1.18) |
| 5 | Acid scavenger Niutang TGIC Changzhou Niutang Chemical Plant Co., China | Triglycidal isocyanurate (1,3,5-Triglycidyl isocyanurate) CAS No. 2451-62-9 | 185.97 | 0.41 | 1.51 | 77.11 | 0.17 | 0.51 |
| 6 | Flow Aid P67 Estron Chemical Inc., Calvert City, KY | Acrylic polymer flow aid | 453.59 | 1.00 | 3.68 | 453.59 | 1.00 | 2.99 |
| 7 | Degassing agent Benzoin Estron Chemical Inc., Calvert City, KY | Benzoin CAS No. 119-53-9 | 226.80 | 0.50 | 1.84 | 226.80 | 0.50 | 1.49 |
| 8 | Flattening agent SynFlow 283TEX Micro Powders Inc,. Terrytown, NY | Synthetic parafin (CAS No 8002-74-2) with Polytetra Fluoroethylene (CAS No. 9002-84-0) blend. | 453.59 | 1.00 | 3.68 | 453.59 | 1.00 | 2.99 |
| 9 | Pigments TR93, Huntsman International, LLC, Houston, TX | Titanium Dioxide (CAS No. 1308-38-9) | 11063.06 | 24.39 | 89.77 | 11063.06 | 24.39 | 72.89 |
| 10 | Pigments Ferro Corporation, Cleveland, OH Rockwood Pigments, Inc., East St. Louis, IL Heubach, GmbH BASF, GmbH | Chromium iron Oxide, Chromium oxide. Iron oxide hydroxides | 4359.00 | 9.61 | 35.37 | 4359.00 | 9.61 | 28.72 |
| | Total | | 45359.00 | 100.00 | 368.05 | 45359.00 | 100.00 | 298.86 |

TABLE 5B

| | | | Example 7 Tan 686A 3607b-52 | | |
|---|---|---|---|---|---|
| No. | Constituent/Source | Description | Amount (grams) | Wt % | PHR |
| 1 | Polyester resin EL-1900 | Hydroxyl polyester with a hydroxyl value 280-320 mg KOH/g and maximum acid value of 10 mg KOH/g | 7393.52 | 16.30 | 64.20 |
| 2 | Fluorocopolymer Lumiflon LF-710F, AGC Chemicals Americas, Inc. Exton, PA | Fluoroethylene and alkyl vinyl ether copolymer FEVE resin with a hydroxyl value of 46±6 mg KOH/g and an acid value of 0. | 4930.52 | 10.87 | 42.81 |

TABLE 5B-continued

|  |  |  | Example 7 Tan 686A 3607b-52 | | |
|---|---|---|---|---|---|
| No. | Constituent/Source | Description | Amount (grams) | Wt % | PHR |
| 3 | Cross-linking agent Crelan EF403 Bayer Material Science LLC, Pittsburgh, PA | Blocking agent free cycloaliphatic polyuretdione hardener with an equivalent weight of 310 or 13.5% NCO content | 15667.00 | 34.54 | 136.04 |
| 4 | Catalyst CreKat XP 2571 Bayer Material Science LLC, Pittsburgh PA | Hydroxyl functional catalyst masterbatch with zinc content of approx. 8% and 25-33% zinc acetylacetonate (CAS No. 14024-63-6). (Active catalyst) | 653.17 (261.27) | 1.44 (0.58) | 5.67 (2.27) |
| 5 | Acid scavenger Niutang TGIC Changzhou Niutang Chemical Plant Co., China | Triglycidal isocyanurate (1,3,5-Triglycidyl isocyanurate) CAS No. 2451-62-9 | 158.76 | 0.35 | 1.38 |
| 6 | Flow Aid P67 Estron Chemical Inc., Calvert City, KY | Acrylic polymer flow aid | 453.59 | 1.00 | 3.94 |
| 7 | Degassing agent Benzoin Estron Chemical Inc., Calvert City, KY | Benzoin CAS No. 119-53-9 | 226.80 | 0.50 | 1.97 |
| 8 | Flattening agent Syn Flow 283TEX Micro Powders Inc., Terrytown, NY | Synthetic parafin (CAS No 8002-74-2) with Polytetra Fluoroethylene (CAS No. 9002-84-0) blend. | 453.59 | 1.00 | 3.94 |
| 9 | Pigments TR93 Huntsman International, LLC, Houston, TX | Titanium dioxide (CAS No. 1308-38-9) | 11063.06 | 24.39 | 96.06 |
| 10 | Pigments Ferro Corporation, Cleveland, OH Rockwood Pigments Inc., East St. Louis, IL Heubach, GmbH BASF, GmbH | Chromium iron oxide, Chromium oxide, Iron oxide hydroxides | 4359.00 | 9.61 | 37.85 |
|  | Total |  | 45359.00 | 100.00 | 393.86 |

TABLE 6

Examples 5-7 Results

| No. | Property | Example 5 | Example 6 | Example 7 |
|---|---|---|---|---|
| 1 | Curing Time and Substrate Temperature | 15 min. @ 190.5° C. | 15 min. @ 190.5° C. | 15 min. @ 190.5° C. |
| 2 | Film Thickness (mils) | 3.5-4.0 mils | 3.5-4.5 mils | 4.0-4.5 mils |
| 3 | 60° Gloss | 0.9 | 0.8 | 0.9 |
| 4 | 85° Sheen | 0.5 | 0.5 | 0.5 |
| 5 | Mandrel Bend | 1/4" Pass | 1/4" Pass | 1/4" Pass |
| 6 | Film thickness for Mandrel Bend | 2.0-3.0 mils | 3.5-4.0 mils | 3.5-4.0 mils |
| 7 | 50 MEK double rubs | Rating: 5 | Rating: 5 | Rating: 5 |
| 8 | Chemical Agent | * * * | * * * | * * * |

As indicated by the PHR values, the range of hydroxyl-containing polyester resin to hydroxyl-containing halogenated copolymer FEVE resin (determined by weight) was 80:20 (Example 5), 20:80 (Example 6), and 60:40 (Example 7). The molar ratio of the isocyanate groups of the polyisocyanate-containing uretdione cross-linking agent to the total hydroxyl number of the resins was 1.15 for each of Examples 5, 6, and 7 representing an excess of isocyanate groups relative to the available hydroxyl groups of the resin component.

The finished-form films produced by the coating compositions of Examples 5-7 had gloss and sheen values, respectively, not exceeding 0.9 which are well within the maximum values of 3.0 (60° gloss) and 8.0 (85° sheen) specified by MIL-PRF-32348 Type III. The flexibility of the finished-form films of Examples 5-7 was excellent; no cracking was observed during the mandrel bend test (ASTMD522 Method B). The coating of Example 5 had excellent flexibility at the indicated thickness.

The coatings of Examples 5-7 were subjected to the MEK double rub test used as a proxy for actual GD and HD chemical agent resistance and each example earned the highest "5" rating. The MEK resistance of Examples 5-7 is indicative of compliance with MIL-PRF-32348 Type III for both GD and HD chemical agent resistance. Examples 5-7 represent matte-appearance chemical-agent-resistant antireflective powder coating compositions fully compliant with MIL-PRF-32348 Type III. Examples 5-7 further indicate that efficacy is not limited to the constituent ranges of the examples and that efficacy can be expected at broader constituent ranges.

Theoretical Example 8

Example 8 is provided as a theoretical example. Table 7 presents the constituents of theoretical Example 8.

TABLE 7

| No. | Constituent/Source | Description | Amount (grams) | Example 8 Tan 686A Wt % | PHR |
|---|---|---|---|---|---|
| 1 | Acrylic resin Joncryl 581 BASF Wyandotte, Michigan | Hydroxyl Acrylic Resin with a hydroxyl value of 151 mg KOH/g and a Tg of 62°. | 9734.49 | 21.46 | 78.99 |
| 2 | Fluorocopolymer Lumiflon LF-710F, AGC Chemicals Americas, Inc. of Exton, PA | Fluoroethylene and alkyl vinyl ether copolymer FEVE resin with a hydroxyl value of 46±6 mg KOH/g and an acid value of 0. | 6489.51 | 14.31 | 52.66 |
| 3 | Acid scavenger Niutang TGIC Changzhou Niutang Chemical Plant Co., China | Triglycidal isocyanurate (1,3,5-Triglycidy l isocyanurate) CAS No. 2451-62-9 | 0.00 | 0.00 | 0.00 |
| 4 | Cross-linking agent Crelan EF403 Bayer Material Science LLC of Pittsburgh, PA | Blocking agent free cycloaliphatic polyuretdione hardener with an equivalent weight of 310 or 13.5% NCO content | 6489.51 | 26.62 | 97.99 |
| 5 | Catalyst CreKat XP 2571, Bayer Material Science LLC of Pittsburgh, PA | Hydroxyl functional catalyst masterbatch with zinc content of approx. 8% and 25-33% zinc acetylacetonate (CAS No. 14024-63-6). (Active catalyst) | 502.12 (200.85) | 1.11 (0.44) | 4.07 (1.63) |
| 6 | Flow Aid P67 Estron Chemical Inc., Calvert City, KY | Acrylic polymer flow aid | 453.59 | 1.00 | 3.68 |
| 7 | Degassing agent Benzoin Estron Chemical Inc., Calvert City, KY | Benzoin CAS No. 119-53-9 | 226.80 | 0.50 | 1.84 |
| 8 | Flattening agent SynFlow 283TEX Micro Powders Inc. Terrytown, NY | Synthetic parafin (CAS No 8002-74-2) with Polytetra Fluoroethylene (CAS No. 9002-84-0) blend. | 453.59 | 1.00 | 3.68 |
| 9 | Pigments TR93, Huntsman International, LLC, Houston, TX | Titanium Dioxide (CAS No. 1308-38-9) | 11806.49 | 26.03 | 95.80 |
| 10 | Pigments Ferro Corporation, Cleveland, OH Rockwood Pigments Inc., East St. Louis, IL Heubach, GmbH BASF, GmbH | Chromium iron oxide, Chromium oxide, Iron oxide hydroxides | 3615.11 | 7.97 | 29.33 |
|  | Total |  | 45358.09 | 100.00 | 368.05 |

It is expected that coating compositions of the type described in theoretical Example 8 with a range of hydroxyl-containing acrylic resin to hydroxyl-containing halogenated copolymer FEVE resin of 60:40 (determined by weight) and a molar ratio of the isocyanate groups of the polyisocyanate-containing uretdione cross-linking agent to the total hydroxyl number of the resins of 1.2, thereby representing an excess of isocyanate groups relative to the available hydroxyl groups of the resin component. A composition according to Example 8 is expected to be compliant with MIL-PRF-32348 Type III.

It is believed that the invention has been described in such detail as to enable those skilled in the art to understand the same and it will be appreciated that variations may be made without departing from the spirit and scope of the invention.

The invention claimed is:

1. A matte-appearance chemical-agent-resistant powder coating composition comprising:
   100 parts resin comprising:
      a hydroxyl-containing resin having a hydroxyl number of at least about 100 and a glass transition temperature (Tg) of at least about 48° C.; and
      a hydroxyl-containing halogenated copolymer resin having a hydroxyl number of at least about 40 and a Tg of at least about 48° C.;
   a polyisocyanate-containing uretdione cross-linking agent having isocyanate groups, the polyisocyanate-containing uretdione being in an amount sufficient to provide a molar ratio of the isocyanate groups to a total of the resin hydroxyl numbers of about 0.8 to about 1.8;
   about 0.1 PHR to about 5 PHR of a uretdione ring-opening catalyst; and
   about 0.1 PHR to about 4.5 PHR of a flattening agent,
whereby the powder coating composition provides a finished-form film which has a 60° gloss of about 3 or less and an 85° sheen of about 8 or less each in accordance with ASTM D523 and which desorbs a maximum of 180 µg of agent HD, a vesicant agent, and desorbs a maximum of 40 µg of agent GD, a toxic nerve agent, each in accordance with MIL-PRF-32348 Section 4.6.19.

2. The powder coating composition of claim 1 wherein the resins are in a ratio of about 20 to about 80 parts by weight of the hydroxyl-containing resin and about 20 to about 80 parts by weight of the hydroxyl-containing halogenated copolymer resin.

3. The powder coating composition of claim 2 wherein the resins are in a ratio of about 35 to about 70 parts by weight of the hydroxyl-containing resin and about 30 to 65 parts by weight of the hydroxyl-containing halogenated copolymer resin.

4. The powder coating composition of claim 3 wherein the resins are in a ratio of about 60 parts by weight of the hydroxyl-containing resin and about 40 parts by weight of the hydroxyl-containing halogenated copolymer resin.

5. The powder coating composition of claim 1 wherein the hydroxyl-containing resin is selected from the group consisting of polyester resin, acrylic resin, and combinations thereof.

6. The powder coating composition of claim 5 wherein the polyester resin comprises a hydroxyl-terminated polyester resin having (a) a molecular weight of about 4,000 to 20,000, (b) an acid value of about 2 to about 11 mg KOH/g, (c) a Tg of about 48° C. to 80° C., and (d) a hydroxyl number of about 100 to about 350 mg KOH/g.

7. The powder coating composition of claim 6 wherein the hydroxyl-terminated polyester resin has a hydroxyl number of about 250 to about 350.

8. The powder coating composition of claim 5 wherein the polyester resin comprises the reaction product of a polyhydric alcohol and an acid selected from the group consisting of polycarboxylic acids, polycarboxylic acid anhydrides, polycarboxylic acid esters, and combinations thereof.

9. The powder coating composition of claim 8 wherein the polyhydric alcohol is selected from the group consisting of ethylene glycol, 1,2 propanediol, 1,3-propanediol, 1,4-butanediol, 2,3-butanediol, 1,6-hexanediol, 1,10-decanediol, neopentyl glycol (NPG), 1,4-bis(hydroxymethyl)cyclohexane, 2-methyl-1,3-propanediol, glycerol, trimethylolpropane, 1,2,6-hexanetriol, di-ethylene glycol, tri-ethylene glycol, tetraethylene glycol, propylene glycol, butylene glycol, and pentaerythritol, quinitol, mannitol, sorbitol, formitol, formose, methyl glycoside, and combinations thereof.

10. The powder coating composition of claim 8 wherein the polycarboxylic acids, polycarboxylic acid anhydrides, and polycarboxylic acid esters are selected from the group consisting of adipic acid, sebacic acid, azelaic acid, dodecanedioic acid, phthalic acid, isophthalic acid, tetrahydrophthalic anhydride, tetrachlorophthalic anhydride, endomethylene tetrahydrophthalic anhydride, glutaric anhydride, maleic anhydride, trimelletic anhydride, fumaric acid, dimerized and trimerized unsaturated fatty acids, terephthalic acid dimethyl ester, terephthalic acid bis-glycol ester, and combinations thereof.

11. The powder coating composition of claim 1 wherein the hydroxyl-containing halogenated copolymer resin is a hydroxyl-containing fluorocopolmer having (a) a molecular weight of about 8,000 to 16,000, (b) a Tg of about 48° C. to 62° C., and (c) a hydroxyl number of about 40 to about 110 mg KOH/g.

12. The powder coating composition of claim 11 wherein the hydroxyl-containing fluorocopolmer resin is a fluoro alkyl vinyl ether copolymer resin with a hydroxyl number of about 40 to about 60.

13. The powder coating composition of claim 12 wherein the fluoro alkyl vinyl ether copolymer resin is a fluoroethylene alkyl vinyl ether copolymer resin.

14. The powder coating composition of claim 13 wherein the fluoroethylene alkyl vinyl ether copolymer resin comprises repeating units of (a) cyclohexyl vinyl ether, (b) fluoroolefin, (c) alkyl vinyl ether, and (d) hydroxyalkyl vinyl ether.

15. The powder coating composition of claim 1 wherein the molar ratio of the isocyanate groups to the total of the resin hydroxyl numbers is about 0.8 to about 1.2.

16. The powder coating composition of claim 1 wherein the polyisocyanate-containing uretdione cross-linking agent has a uretdione content of about 3 to about 18 percent by weight.

17. The powder coating composition of claim 1 wherein the polyisocyanate-containing uretdione cross-linking agent comprises a cyclic aliphatic uretdione.

18. The powder coating composition of claim 17 wherein the cyclic aliphatic uretdione is an adduct of isophorone diisocyanate.

19. The powder coating composition of claim 1 wherein the uretdione ring-opening catalyst is selected from the group consisting of organometallic compounds, quaternary ammonium hydroxides, quaternary ammonium fluorides, quaternary phosphonium hydroxides, ammonium carboxylate compounds, and combinations thereof.

20. The powder coating composition of claim 19 wherein the organometallic compounds are selected from the group consisting of metal acetylacetonates, metal hydroxides, metal alkoxides, and combinations thereof.

21. The powder coating composition of claim 20 wherein the metal alkoxides are selected from the group consisting of zinc(II) acetylacetonate, calcium acetylacetonate, magnesium acetylacetonate, aluminum(III) acetylacetonate, zirconium(IV) acetylacetonate, aluminum(III) acetylacetonate, and combinations thereof.

22. The powder coating composition of claim 19 wherein the quaternary ammonium hydroxides, quaternary ammonium fluorides, quaternary phosphonium hydroxides, and ammonium carboxylate compounds are selected from the group consisting of tetramethylammonium benzoate, tetrabutylammonium acetate, tetrabutylphosphonium benzoate, methyltributylammonium hydroxide, tetramethylammonium fluoride, tetramethylammonium chloride, tetramethylammoniumbromide, benzyl trimethyl ammonium hydroxide, benzyltriethylammonium, tetramethylammonium fluoride, tetraethylammonium, tetrabutyl ammonium acetate, tetraethyl ammonium phosphate, and combinations thereof.

23. The powder coating composition of claim 1 wherein the flattening agent is selected from the group consisting of polytetrafluoroethylene, clay, magnesium silicate, polypropylene, polyethylene, beeswax, lanolin, lanocerin, shellac, ozokerite, paraffin, carnauba, candellila, jojoba, ouricouri, montan, fatty acid amides, polyamides, alkali alumino silicate ceramic microspheres, alumino silicate glass microspheres or flakes, and combinations thereof.

24. The powder coating composition of claim 1 further comprising pigment in an amount of about 1 PHR to about 150 PHR.

25. The powder coating composition of claim 24 wherein the pigment is selected to meet MIL-PRF-32348 Type III and an infrared spectra requirement thereof.

26. The powder coating composition of claim 24 wherein the pigment is selected from the group consisting of organic pigments, inorganic pigments, and combinations thereof.

27. The powder coating composition of claim 26 wherein the inorganic pigments are selected from the group consisting of metal oxides, mixed metal oxides, and combinations thereof.

28. The powder coating composition of claim 27 wherein the metal oxides and mixed metal oxides are selected from the group consisting of titanium dioxide, chromium oxide, iron oxide hydroxides, cobalt chromite green spinel, ferrous ferric oxide, iron (III) oxide, magnesium oxide, red oxide, yellow oxide, and combinations thereof.

29. The powder coating composition of claim 26 wherein the organic pigments are selected from the group consisting of carbon black, azopigments, phthalocynin pigments, and combinations thereof.

30. The powder coating composition of claim 1 further comprising up to about 2 PHR of an acid scavenger selected from the group consisting of triglycidyl isocyanurate (TGIC), gylcidal methyl methacrylate epoxy, hydroxyl alkylamide, and combinations thereof.

31. An article coated with the powder coating composition of claim 1.

32. A matte-appearance chemical-agent-resistant powder coating composition comprising:
    100 parts resin comprising:
        a hydroxyl-containing polyester resin having a hydroxyl number of at least about 100; and
        a hydroxyl-containing fluoro alkyl vinyl ether copolymer resin with a hydroxyl number of about 40 to about 60;
    a polyisocyanate-containing uretdione cross-linking agent having isocyanate groups, the polyisocyanate-containing uretdione being in an amount sufficient to provide a molar ratio of the isocyanate groups to a total of the resin hydroxyl numbers of about 0.8 to about 1.8;
    about 0.1 PHR to about 5 PHR of a uretdione ring-opening zinc (II) acetylacetonate catalyst; and
    about 0.1 PHR to about 4.5 PHR of a flattening agent,
whereby the powder coating composition provides a finished-form film which has a 60° gloss of about 3 or less and an 85° sheen of about 8 or less each in accordance with ASTM D523 and which desorbs a maximum of 180 µg of agent HD, a vesicant agent, and desorbs a maximum of 40 µg of agent GD, a toxic nerve agent, each in accordance with MIL-PRF-32348 Section 4.6.19.

\* \* \* \* \*